US012492117B2

(12) United States Patent
Stuchlik et al.

(10) Patent No.: US 12,492,117 B2
(45) Date of Patent: Dec. 9, 2025

(54) METHODS FOR DISTRIBUTING BLENDED FUELS

(71) Applicant: PHILLIPS 66 COMPANY, Houston, TX (US)

(72) Inventors: Benjamin J. Stuchlik, Houston, TX (US); Marisa E. Carroll, Cypress, TX (US)

(73) Assignee: Phillips 66 Company, Houston, TX (US)

( * ) Notice: Subject to any disclaimer, the term of this patent is extended or adjusted under 35 U.S.C. 154(b) by 85 days.

(21) Appl. No.: 18/451,281

(22) Filed: Aug. 17, 2023

(65) Prior Publication Data

US 2024/0059552 A1 Feb. 22, 2024

Related U.S. Application Data

(60) Provisional application No. 63/399,059, filed on Aug. 18, 2022, provisional application No. 63/399,067, filed on Aug. 18, 2022.

(51) Int. Cl.

*B67D 7/04* (2010.01)
*B67D 7/16* (2010.01)
*B67D 7/30* (2010.01)
*B67D 7/56* (2010.01)
*B67D 7/74* (2010.01)

(52) U.S. Cl.

CPC ........... *B67D 7/302* (2013.01); *B67D 7/0498* (2013.01); *B67D 7/16* (2013.01); *B67D 7/56* (2013.01); *B67D 7/743* (2013.01); *B67D 7/744* (2013.01); *B67D 2007/746* (2013.01); *B67D 2007/748* (2013.01)

(58) Field of Classification Search

CPC ........ B67D 7/302; B67D 7/0498; B67D 7/16; B67D 7/74; B67D 2007/745; B67D 2007/748

See application file for complete search history.

(56) References Cited

U.S. PATENT DOCUMENTS

2010/0264162 A1* 10/2010 Cratensburg ............. B67D 7/04 222/129
2019/0062142 A1* 2/2019 Bevins ............... G01N 33/2835

* cited by examiner

*Primary Examiner* — Jason K Niesz
(74) *Attorney, Agent, or Firm* — Phillips 66 Company

(57) ABSTRACT

The disclosure relates to methods for distributing alcohol-containing gasoline. The methods herein facilitate the combination of gasoline blendstocks and alcohols to create finished gasoline products. The methods herein also measure the volumes and other characteristics of the gasoline blendstocks and alcohols and employ computers and controllers that calculate the gross and net volumes of liquids, including the net volume of finished gasoline products.

8 Claims, 4 Drawing Sheets

METHODS FOR DISTRIBUTING BLENDED FUELS

CROSS-REFERENCE TO RELATED APPLICATIONS

This application is a non-provisional application which claims the benefit of and priority to U.S. Provisional Application Ser. No. 63/399,067 filed Aug. 18, 2022, entitled "Methods for Distributing Blended Fuels" and U.S. Provisional Application Ser. No. 63/399,059 filed Aug. 18, 2022, entitled "Systems for Distributing Blended Fuels," which are both hereby incorporated by reference in their entirety.

STATEMENT REGARDING FEDERALLY SPONSORED RESEARCH OR DEVELOPMENT

None.

FIELD OF THE INVENTION

This invention relates to methods and systems for distributing alcohol-containing gasoline

BACKGROUND OF THE INVENTION

Gasoline is comprised of a complex mixture of volatile hydrocarbons which is suitable for use as a fuel in a spark-ignition internal combustion engine. Although gasoline can consist of a single blendstock, such as the product from a refinery alkylation unit, it is usually comprised of a blend of several blendstocks. The blending of gasoline is a complex process, which typically involves the combination of from as few as three or four to as many as twelve or more different blendstocks to meet regulatory requirements and such other specifications as the manufacturer may select. Optimization of this blending process must take into account a plurality of characteristics of both the blendstocks and the resulting gasoline. Among others, such characteristics can include cost and various measurements of volatility, octane, and chemical composition.

It is conventional practice in the industry to blend gasoline using blendstock ratios which are determined by mathematical algorithms which are known as blending equations. Such blending equations are well known in the refining industry and are either developed or tailored by each refiner for use in connection with available blendstocks. Blending equations typically relate the properties of a gasoline blend to the quantity of each blendstock in the blend and also to either the measured or anticipated properties of each blendstock in the blend.

Although hydrocarbons usually represent a major component of gasoline, it has been found that certain oxygen containing organic compounds can be advantageously included as gasoline components. These oxygen containing organic compounds are referred to as oxygenates, and they are useful as gasoline components because they are usually of high octane and may be a more economical source of gasoline octane than a high octane hydrocarbon blending component such as alkylate or reformate. Oxygenates which have received substantial attention as gasoline blending agents include ethanol, t-butyl alcohol, methyl t-butyl ether, ethyl t-butyl ether, and methyl t-amyl ether. However, ethanol and other alcohols have become the most widely used oxygenates.

Ethanol is not usually blended into a finished gasoline within a refinery because the ethanol is water soluble. As a consequence of this solubility, an ethanol-containing gasoline can undergo undesirable change if it comes in contact with water during transport through a distribution system, which may include pipelines, stationary storage tanks, rail cars, tanker trucks, barges, ships and the like. For example, an ethanol-containing gasoline can absorb or dissolve water which will then be present as an undesirable contaminant in the gasoline. Alternatively, water can extract ethanol from the gasoline, thereby changing the chemical composition of the gasoline and negatively affecting the specifications of the gasoline.

In order to avoid, as much as possible, any contact with water, ethanol-containing gasoline is usually manufactured by a multi-step process wherein the ethanol is incorporated into the product at a point which is near the end of the distribution system. More specifically, gasoline which contains a water soluble alcohol, such as ethanol, is generally manufactured by producing an unfinished and substantially hydrocarbon precursor blend at a refinery, transporting the unfinished blend to a product terminal in the geographic area where the finished gasoline is to be distributed, and mixing the unfinished blend with the desired amount of alcohol at the product terminal.

It has been discovered that blending mixtures of ethanol and gasoline blendstocks also results in an apparent volume growth due to interactions between alcohol and gasoline blendstocks—aside from the simple thermal expansion—when the resulting mixture is measured for volume in comparison to the relative volumes of the component parts. Experimental and field experience has demonstrated that blending ethanol into gasoline blending stocks results in a mixture that exhibits apparent volume growth over that simple addition of the blended volumes. The mixture also shows an incremental increase in the coefficient of thermal expansion over that expected by volume proportional addition of the blend stock coefficients.

Because gasoline—including alcohol-containing gasoline—is typically sold based on volume measurement (gallons), there exists a need for systems and processes that accurately distribute, and report net volume of final gasoline product distributed at terminals, refineries, and other locations.

BRIEF SUMMARY OF THE DISCLOSURE

The present embodiment relates to methods for distributing alcohol-containing gasoline. In one embodiment, a gasoline blendstock source, which comprises gasoline blendstock, is created. Characteristics such as temperature of the gasoline blendstock are tested and recorded. The gasoline blendstock is in fluid communication with a gasoline blendstock flow meter configured to determine gross quantities of contents of gasoline blendstock. An alcohol source, which comprises alcohol, is created. Characteristics such as temperature of the alcohol are tested and recorded. The alcohol is in fluid communication with an alcohol flow meter configured to determine gross quantities of contents of alcohol. A control system in connection with equipment is configured to monitor and control the operations. The contents of the gasoline blendstock source and the alcohol source are in fluid communication with one another and are mixed together at a distribution point to create a finished gasoline product. A volume correction computer is in connection with system components and is configured to determine the net volume of finished gasoline product at the distribution point.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

General Definitions

Figure 1:
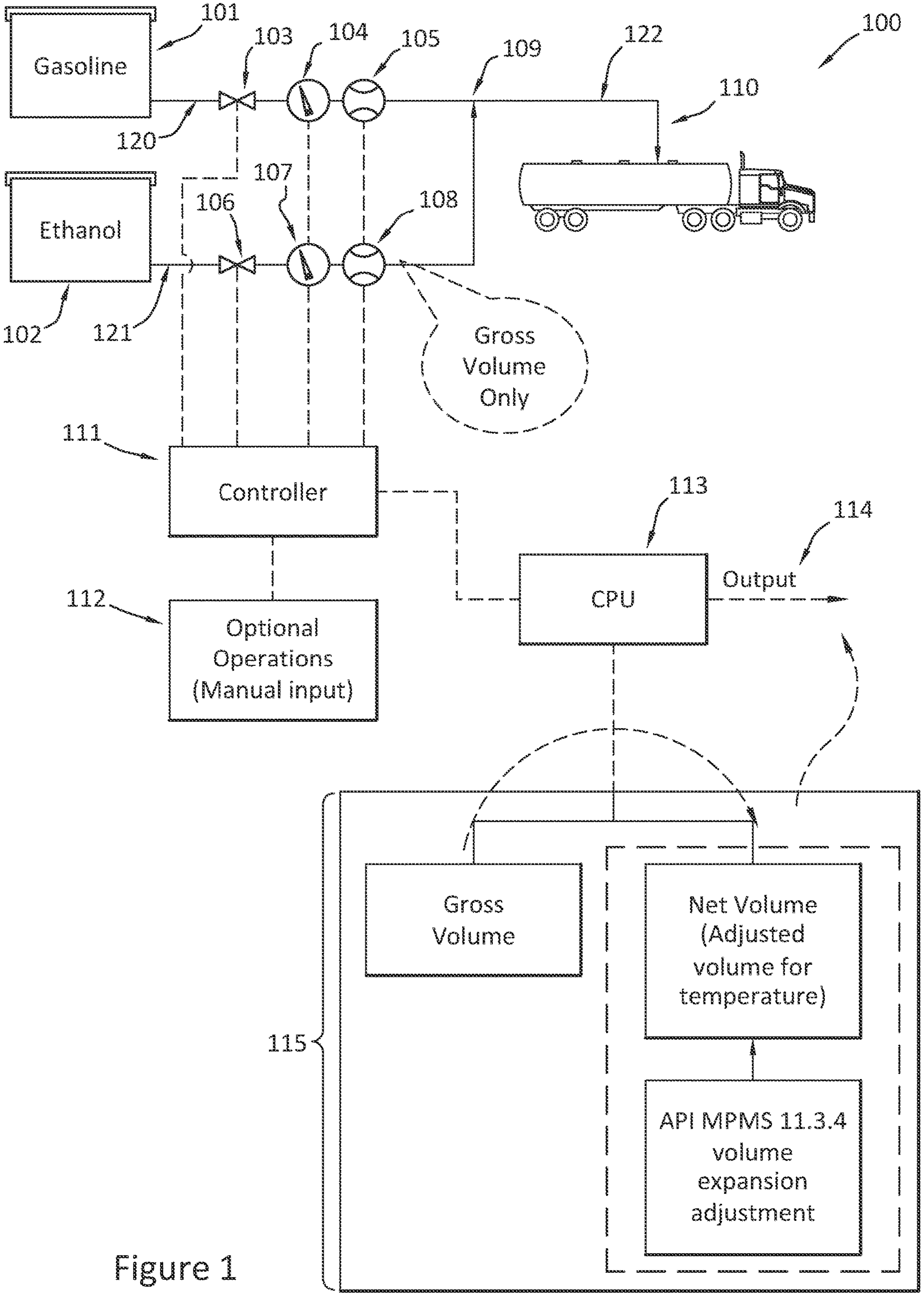
FIG. 1 depicts a system for distributing alcohol-containing gasoline.

In this specification and in the claims that follow, reference will be made to a number of terms, which shall be defined to have the following meanings:

A substantially hydrocarbon precursor blend which can be converted to a finished gasoline by mixing with one or more oxygenates (including alcohols) is referred to herein either as a "subgrade" or as a "subgrade blend." The combination of the subgrade with the alcohol yields a finished gasoline product. The subgrade is commonly called a RBOB (Reformulated Blendstock for Oxygenate Blending) when the subgrade is destined for a reformulated gasoline market in the U.S. In other words, a subgrade includes (1) individual refinery streams suitable for use as a blend stock for gasoline, and/or (2) a blended gasoline stream formed by blending two or more streams, each of which are suitable for use as a gasoline blend stock. A suitable gasoline blend stock, when blended with other refinery streams, produces a combined stream which meets the requirements for gasoline, which are well documented in Federal and State regulations. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending. The terms "gasoline blendstock," "oxygenate free blend stock," "subgrade," "subgrade blend," "reformulated blendstock for oxygenate blending (RBOB)," "blendstock for oxygenate blending (BOB)," "blendstock," "gasoline fraction," "high octane blendstock (HOBS)," "fungible regular grade," "fungible gasoline" and "hydrocarbon precursor blend" shall be used interchangeably to mean a substantially hydrocarbon precursor blend which can be converted to a finished gasoline product by mixing with one or more oxygenates (including alcohols). "Blendstock" and "blend stock" shall be used interchangeably and have the same meaning as one another.

Throughout this patent application, whenever an analysis of gasoline, or ethanol is disclosed, the analysis can be performed in accordance with applicable EPA regulations, American Society for Testing and Materials ("ASTM"), and American Petroleum Institute ("API") methods and standards.

The term gasoline, when used herein, refers to any refined petroleum product that can flow through a petroleum pipeline. The term includes any liquid that can be used as fuel in an internal combustion engine, non-limiting examples of which include fuels with an octane rating between 80 and 95, fuels with an octane rating between 80 and 85, fuels with an octane rating between 85 and 90, and fuels with an octane rating between 90 and 95. The term includes products that consist mostly of aliphatic components, as well as products that contain aromatic components and branched hydrocarbons such as iso-octane. The term also includes all grades of conventional gasoline, reformulated gasoline ("RFG"), diesel fuel, biodiesel fuel, jet fuel, and transmix. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending. Gasolines for ethanol blending can be gasolines used to create virtually any type of gasoline and ethanol blend. For example, the gasolines for ethanol blending can be used to create a gasoline: ethanol blend of a ratio of about 9 to 1, 4 to 1, 1 to 1, 1 to 4, 15 to 85, or 1 to 9. As used in this application the term "high-octane terminal blend stock" or "HOBS" means a blend stock having an (R+M)/2 octane of 95 or more, and that is purposefully manufactured for blending, at a terminal, with a fungible regular grade gasoline or fungible regular grade BOB available from a pipeline or other source of fungible material.

The term alcohol, when used herein, refers to any alcohol-containing solution that can be used in an alcohol and gasoline blend. The term thus includes starch based alcohol, sugar based alcohol, and cellulose based alcohol. The term alcohol may include one type of alcohol, a solution comprising alcohol, an alcohol-water solution or azeotrope, nominally anhydrous alcohol, an alcohol solution comprising alcohol which may or may not include other alcohols, a solution comprising alcohol and denaturants, and other oxygenate solutions that contain alcohol.

The term ethanol, when used herein, refers to any ethanol-containing solution that can be used in an ethanol and gasoline blend. The term thus includes starch based ethanol, sugar based ethanol, and cellulose based ethanol. The term ethanol may include pure ethanol, a solution comprising ethanol, an ethanol-water solution or azeotrope, nominally anhydrous ethanol, an alcohol solution comprising ethanol which may or may not include other alcohols, a solution comprising ethanol and denaturants, and other oxygenate solutions that contain ethanol. Ethanol, as used herein, may or may not comply with ASTM D4806-21 or similar specifications.

As used herein, the term "about" modifying the quantity of an ingredient or reactant of the invention employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or to carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value, preferably within 5% of the reported numerical value.

The term "gasoline blendstock source," when used herein, refers to a source of gasoline blendstock from any location, storage tank, vessel, container, or any point along a petroleum pipeline.

The term "alcohol source," when used herein, refers to alcohol that is to be mixed with gasoline or a gasoline blendstock from any location, storage tank, vessel, container, or any point along a petroleum pipeline.

The term "ethanol source," when used herein, refers to ethanol that is to be mixed with gasoline or a gasoline blendstock from any location, storage tank, vessel, container, or any point along a petroleum pipeline.

The term "finished gasoline product," when used herein, refers to a gasoline blendstock that has been combined with one or more oxygenates. The terms finished "finished gasoline product," "finished gasoline," "fuel blend," "gasoline product," "finished transportation fuel," "finished fuel," "finished alcohol containing gasoline," "alcohol-containing gasoline," "finished alcohol containing fuel," "alcohol-containing fuel," and "oxygenated gasoline" shall have the same meaning as "finished gasoline product" above.

The word "terminal" as used in this application is meant to include gasoline blending terminals as well as any other facility where a gasoline (or component of gasoline) may be blended with a second component (including but not limited to an alcohol) to produce a "finished gasoline product." Terminal may include, but is not to be limited to, tanks, vessels, containers, pipelines, and conduits.

A "distribution point" is the point in a system or a process in which a gasoline blendstock source is mixed with an alcohol source or ethanol source to create a finished gasoline product. A distribution point may take place inside a tank, pipe, vessel, container, a truck or trailer, conduit, or other location where the gasoline blendstock source meets an alcohol source or an ethanol source.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

Aspects of the invention may take place in the forms of systems, apparatuses, methods, processes and/or any other means known to those skilled in the art.

Gasoline is comprised of a complex mixture of volatile hydrocarbons (such as aromatics, olefins, naphthenes and paraffins, with reformulated gasoline most often containing an oxygen compound) which is suitable for use as a fuel in a spark-ignition internal combustion engine, and it typically boils over a temperature range of about room temperature to about 437° F. Because gasolines are generally composed of a mixture of numerous hydrocarbons having different boiling points at atmospheric pressure. Thus, a gasoline fuel boils or distills over a range of temperatures, unlike a pure compound. This temperature range is approximate, of course, and the exact range will depend on the conditions that exist in the location where the automobile is driven. The distillation profile of the gasoline can also be altered by changing the mixture in order to focus on certain aspects of gasoline performance, depending on the time of year and geographic location in which the gasoline will be used.

Although gasoline can consist of a single blendstock, such as the product from a refinery alkylation unit, it is usually comprised of a blend of several blendstocks. The blending of gasoline is a complex process, which can involve the combination of from as few as one, two, three, or four to as many as twelve or more different blendstocks to meet regulatory requirements and such other specifications as the manufacturer may select. Optimization of this blending process must take into account a plurality of characteristics of both the blendstocks and the resulting gasoline. Among others, such characteristics can include cost and various measurements of volatility, octane, and chemical composition. Producing differentiated gasolines in this manner allows mid- and premium grade differentiated gasolines to be produced at a terminal, on demand, rather than requiring the shipment of complete premium gasoline or oxygenate-free blend stocks ("BOBs") to the terminal for storage and later distribution. Producing mid-grade and premium gasolines in this manner can substantially reduce pipeline shipping volumes and inventory requirements and can increase product slate flexibility at the terminal.

In one embodiment, the gasoline can also be blended to achieve any octane rating (R+M)/2 (average of the motor octane rating and research octane rating) desired. A regular gasoline with an octane rating of at least 87, a mid-grade gasoline with an octane rating of at least 89 or 90, or a premium gasoline with an octane rating of at least 91 can all be prepared in accordance with the present invention. In other embodiments, the composition has an octane rating of at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 and useful ranges can be selected between any of these values (for example, from about 80 to about 110, or from about 87 to about 105). Octane rating standards and methods for measuring octane rating are known, and can include, but are not limited to, those described in ASTM D-4814, D-2699 and D-2700 and can include accepted reference values for numbers greater than 100.

Terminals are an important part of the transportation fuel supply chain, moving products to enduser markets. Their primary function is to store and distribute fuels. A typical terminal serving the on-road transportation fuels market would store regular and premium gasoline blendstock for oxygenate blending, diesel, denatured ethanol, and additives. In one embodiment, these fuel types are stored in individual tanks. The number of tanks and the capacity for each fuel type are dependent on demand for the market the terminal serves and may vary. In some embodiments, terminals are constantly receiving and dispensing fuel—the mode of fuel receipt varies and may include pipeline, truck, barge/ship, and rail. A single terminal may serve many different customers through established contracts. In one embodiment, trucks arrive at a terminal and operators select fuels for their customers. Based on the fuels selected in a particular embodiment, products are pulled from various tanks to dispense a finished transportation fuel into the truck. Note that trucks can have multiple compartments and transport several fuels at one time.

In one embodiment, a terminal may include many pieces of equipment designed to safely offload fuel from multiple transportation modes, store it, and load it into trucks for delivery to fuel stations. Some of the most common equipment at terminals in various embodiments are: pipes, valves, meters, sensors, and pumps, but there are others known to those skilled in the art. Pipes, usually made of steel with welded joints, move fuel to storage tanks and deliver fuel to the loading rack. Valves are used throughout the system to control the flow of fuel. Meters measure the flow rate of fluids and controllers control or regulate the flow rate of fuel (fluids) to ensure an accurate blend, and pumps move fuel throughout the terminal. Controllers are implemented at various points in the system to receive operational inputs (e.g., desired gasoline/alcohol ratios, octane desired, flowrates, volumes, temperatures, pressures, chemical compositions, and other characteristics) and the controllers may also control system implementations such as valves, pumps and other operational equipment for desired outputs. Flow meters (monitors) in the embodiments herein may include oval gear meters, orifice-square edge, orifice-conic edge, venturi, pitot tube, electromagnetic, turbine, ultrasonic-transient time, Doppler, rotometer, vortex, or coriolis flow meters. Flow meters may also include ultrasonic or ultrasound flow meters, intrusive or humidified flow meters, venturi channels, overflow plates, radar flow meters, Coriolis flow meters, differential pressure flow meters, magnetic inductive flow meters and other types of flow meters. It is understood that other suitable flow meters known to those skilled in the art may also be used. The control system may include controllers, meters or sensors, pumps, valves, wiring or wireless connection/connectivity components, computers, and other components to control the flow of fluids.

In one embodiment, trucks are loaded with finished fuel products at the loading rack—a sheltered area with multiple bays. Loading rack equipment includes loading arms that connect to the truck to deliver fuel, vapor recovery that is either burned off or collected to re-capture fuel products, a grounding line, a fire suppression system, and a computerized system for truckers to select fuels to be loaded. In one embodiment, a computer (which may be different from the control system computers or incorporated therein), may calculate the temperature and/or volumetric expansion of gasoline to determine a net volume of material to be transferred and output from the terminal.

The blendstock feeds to the processes disclosed herein may include one or more petroleum fractions which boil in the gasoline boiling range, including FCC gasoline, coker pentane/hexane, coker naphtha, FCC naphtha, straight run gasoline, and mixtures containing two or more of these streams. Such gasoline blending streams typically have a normal boiling point within the range of 0° C. and 260° C., as determined by an ASTM D86 distillation. Feeds of this type include light naphthas typically having a boiling range of about C6 to 165° C. (330° F.); full range naphthas, typically having a boiling range of about C5 to 215° C. (420° F.), heavier naphtha fractions boiling in the range of about 125° C. to 210° C. (260° F. to 412° F.), or heavy gasoline fractions boiling at, or at least within, the range of about 165° C. to 260° C. (330° F. to 500° F.), preferably about 165° C. to 210° C. In general, a gasoline fuel will distill over the range of from about room temperature to 260° C. (500° F.). In some embodiments, these streams may be treated to remove sulfur, nitrogen, and other undesired components.

Gasoline fractions for use as blendstocks described herein may include C3 to C9 and higher hydrocarbons. In this application, the term "C(number)" means a hydrocarbon solution comprising hydrocarbon molecules having that number of carbon atoms, but not necessarily a pure solution. For example, refinery streams are usually separated by fractional distillation. A light naphtha cut is one such refinery stream, and because such a cut often contains compounds that are very close in boiling points, the separations are not precise. The light naphtha refinery cut is valuable as a source of isoolefins (iC5= and iC6=compounds, for example) for forming an ether by reaction with ethanol. Thus, a C5 stream, for instance, may include C4s and up to C8s and higher. These components may be saturated (alkanes), unsaturated (mono-olefins, including isoolefins), and poly-unsaturated (diolefins, for example). Additionally, the components may be any or all of the various isomers of the individual compounds. Such a mixture may easily contain 150 to 200 components. Other hydrocarbon streams of C4 to C9 carbon atoms may be used in embodiments disclosed herein.

In some embodiments, gasoline blendstock fractions may include a C4 cut, which may include C3 to C5 or higher hydrocarbons (i.e., C6+). In other embodiments, gasoline fraction blendstocks may include a C5 cut, which may include C4 to C8 or higher hydrocarbons, including olefins. In other embodiments, gasoline fractions may include a C6 cut, which may include C4 to C9 or higher hydrocarbons, including olefins. In other various embodiments, gasoline fractions may include mixtures of one or more of C4, C5, C6, and C7+ hydrocarbons, where the mixture includes olefinic compounds. The above-described streams may include C4 to C7 streams, gasoline fractions, FCC gasoline, coker gasoline, and other refinery streams having similar properties.

Saturated compounds included in the above-described gasoline fractions may include various isomers of butane, various isomers of pentane, and various isomers of hexane, among others, for example. Olefinic compounds included in the above-described gasoline fractions may include isobutylene and other butene isomers, various isomers of pentene, various isomers of hexene, and various isomers of heptene, among others, for example. In some embodiments, the gasoline fractions may be derived from any source, and may include a concentration of 1 to 45 weight percent etherifiable isoolefins; a concentration of 10 to 30 weight percent isoolefins in other embodiments; and a concentration of 15 to 25 weight percent isoolefins in yet other embodiments.

In some embodiments, examples of hydrocarbon feedstocks that may be employed to form fuel compositions include straight-run products, reformate, cracked gasoline, high octane stock, isomerate, polymerization stock, alkylate stock, hydrotreated feedstocks, desulfurization feedstocks, and the like. When forming a fuel composition, one or more hydrocarbon feedstocks can be employed, two or more hydrocarbon feedstocks can be employed, three or more hydrocarbon feedstocks can be employed, four or more hydrocarbon feedstocks can be employed, and so on. The composition typically includes the mixed refinery stream hydrocarbons selected from the group consisting of heavy reformate, isomerate, alkylate, light catalytically-cracked naphtha (also called "light cat naphtha" or "light catalytic naphtha"), toluene, light reformate, total reformate, butane and mixtures thereof.

Straight-run products, such as naphthas and kerosene, are obtained from distillation of crude oil. A reformer converts naphthas and/or other low octane gasoline fractions into higher octane stocks, such as converting straight chain paraffins into aromatics. Reformate contains these higher octane stocks. Cracked gasoline, the product of cracking, contains lower boiling hydrocarbons made by breaking down hydrocarbons with high boiling points. Cracking typically involves catalytic cracking and hydrocracking.

Isomerization converts and rearranges the molecules of straight chain paraffins (typically low octane hydrocarbons) into branched isomers (typically high octane hydrocarbons). Isomerate contains the products of isomerization. Polymerization stock contains polymerized olefins, the olefins often the product of cracking processes. Alkylate stock contain the products of alkylation. Alkylation involves combining small, gaseous hydrocarbons into liquid hydrocarbons. Hydrotreated feedstocks contain the products of hydrotreating. Hydrotreating involves diverse processes including the conversion of benzene to cyclohexane, aromatics to naphthas, and the reduction of sulfur and nitrogen levels. Processes that specifically reduce sulfur levels are often termed desulfurization.

In some embodiments, additives are introduced to the gasoline feedstocks, alcohol feedstocks, or product streams. Additives may include gasoline-soluble chemicals that are mixed with fuel composition components to enhance or improve certain performance characteristics or to provide characteristics not inherent in the gasoline. Examples of additives include antioxidants, corrosion inhibitors, metal deactivators, demulsifiers, antiknock compounds, deposit control additives, anti-icing additives, dyes, drag reducers, detergents, octane enhancers such as tetraethyl lead and the like. One or more additive, two or more additives, three or more additives, four or more additives, and so on, can be added to the fuel composition.

Some embodiments may also include antioxidants, which are typically aromatic amines and hindered phenols. Antioxidants prevent gasoline components from reacting with oxygen in the air to form peroxides or gums. Corrosion inhibitors are typically carboxylic acids and carboxylates. Corrosion inhibitors prevent free water in fuel compositions from rusting or corroding tanks and pipes. Metal deactivators are typically chelating agents, chemical compounds which capture specific metal ions. More-active metals, like copper and zinc, effectively catalyze the oxidation of gasoline. Metal deactivators inhibit their catalytic activity. Demulsifiers are typically polyglycol derivatives. A gasoline-water emulsion can be formed when gasoline passes through the high-shear field if the gasoline is contaminated with free water. Demulsifiers improve the water separating characteristics of gasoline by preventing the formation of stable emulsions. Antiknock compounds increase the antiknock quality of gasoline. Dyes are oil-soluble solids and liquids used to visually distinguish batches, grades, or applications of gasoline products. Drag reducers are typically high-molecular-weight polymers that improve the fluid flow characteristics of low-viscosity petroleum products.

As will be apparent to those of skill in the art, any number of gasoline additives may also be introduced into the fuel at the refinery, terminal, or elsewhere in the manufacturing chain into the high octane blendstocks (HOBS) or at the terminal in accordance with our invention. Such additives can include detergents, demulsifiers, corrosion inhibitors, deposit modifiers, deicers, antiknock compounds, antioxidants, metal deactivators, valve seat recession preventives, spark enhancers, combustion modifiers, friction modifiers, antifoam agents, conductivity improvers, oxygenates, static dissipaters and the like. One or more of these may be added to the finished gasoline products made in accordance with our invention to further differentiate the gasoline products from those manufactured by other refiners or to enhance the performance, efficiency or to reduce emissions from the finished gasoline products.

In some embodiments, the gasoline fraction is transported to a blending site which is: geographically proximate to the area in which the finished alcohol-containing gasoline is to be distributed for use as a fuel and geographically distant from the place where the gasoline fraction is prepared. For example, the fuel containing ethanol may then be prepared by admixture with a desired amount of alcohol or other gasoline fractions at said blending site.

It is conventional practice in the industry to blend gasoline using blendstock ratios which are determined by mathematical algorithms which are known as blending equations. Such blending equations are well known in the refining industry and are either developed or tailored by each refiner for use in connection with available blendstocks. Blending equations typically relate the properties of a gasoline blend to the quantity of each blendstock in the blend and also to either the measured or anticipated properties of each blendstock in the blend.

Although hydrocarbons usually represent a major component of gasoline, it has been found that certain oxygen containing organic compounds can be advantageously included as gasoline components. These oxygen containing organic compounds are referred to as oxygenates, and they are useful as gasoline components because they are usually of high octane and may be a more economical source of gasoline octane than a high octane hydrocarbon blending component such as alkylate or reformate. Oxygenates which have received substantial attention as gasoline blending agents include ethanol, t-butyl alcohol, methyl t-butyl ether, ethyl t-butyl ether, and methyl t-amyl ether. However, alcohols, and particularly ethanol, have become one of the most widely used oxygenates.

Oxygenated gasoline is a mixture of conventional hydrocarbon-based gasoline and one or more oxygenates. Oxygenates are combustible liquids which are made up of carbon, hydrogen and oxygen. Generally, the current oxygenates used in reformulated gasolines are alcohols, particularly ethanol.

One aspect of some embodiments relates to automated method of making and distributing a fuel composition, involving identifying one or more predetermined properties (or characteristics) of the fuel composition; flowing one or more hydrocarbon feedstock, one or more oxygenate feedstock, and optionally one or more additives into a blending system (e.g., tank, pipeline, vessel, truck, etc.), each of the one or more hydrocarbon feedstock, one or more oxygenate feedstock, and one or more additive feed having a flow rate; determining one or more current properties of the fuel composition mixture; comparing the predetermined properties of the fuel composition with the current properties of the fuel composition mixture; and adjusting the charge rate of at least one of the one or more hydrocarbon feedstocks, one or more oxygenate feedstocks, and one or more additives in response to the comparison to provide the fuel composition.

Another embodiment relates to a batch process for creating the final fuel composition, involving identifying one or more predetermined properties (or characteristics) of the fuel composition; providing one or more hydrocarbon feedstock, one or more oxygenate feedstock, and optionally one or more additives into a blending system (e.g., tank, pipeline, vessel, truck, etc.), each of the one or more hydrocarbon feedstock, one or more oxygenate feedstock, and one or more additive feed having a volume; determining one or more current properties of the fuel composition mixture; comparing the predetermined properties of the fuel composition with the current properties of the fuel composition mixture; and adjusting the amount of at least one of the one or more hydrocarbon feedstocks, one or more oxygenate feedstocks, and one or more additives in response to the comparison to provide the fuel composition.

Fuel compositions in accordance with some embodiments are made by combining one or more hydrocarbon feedstocks, optionally one or more oxygenate feedstocks, and optionally one or more additives. The fuel compositions are typically combined by blending the various feedstock(s)/stream(s) and optional additive(s) to obtain a substantially homogenous mixture. Fuel compositions are generally composed of a mixture of numerous hydrocarbons having different boiling points at atmospheric pressure. Thus, a fuel composition boils or distills over a range of temperatures, unlike a pure compound. In general, a fuel composition distills over the range of from about room temperature to about 487° F. This temperature range is approximate, and the exact range depends on the refinery feed streams used to make the fuel composition and the environmental requirements for the resultant fuel composition. Fuel compositions typically contain aromatics, olefins, and paraffins, optionally an oxygen containing compound, i.e., an oxygenate, and optionally one or more of various additives.

The specific amount of ethanol that can be blended with a particular blend stock can be determined by creating a model from a number of runs as shown in the examples. Once such a model is created, the desired amount of ethanol can be determined and blended according to the model in order to meet the requirements.

Alcohol (ethanol) is not necessarily blended into a finished gasoline within a refinery because the ethanol is water soluble. As a consequence of this solubility, an ethanol-containing gasoline can undergo undesirable change if it comes in contact with water during transport through a distribution system, which may include pipelines, stationary storage tanks, rail cars, tanker trucks, barges, ships and the like. For example, an ethanol-containing gasoline can absorb or dissolve water which will then be present as an undesirable contaminant in the gasoline. Alternatively, water can extract ethanol from the gasoline, thereby changing the chemical composition of the gasoline and negatively affecting the specifications of the gasoline.

In order to avoid, as much as possible, any contact with water, ethanol-containing gasoline is usually manufactured by a multi-step process wherein the ethanol is incorporated into the product at a point which is near the end of the distribution system. More specifically, gasoline which contains a water soluble alcohol, such as ethanol, is generally manufactured by producing an unfinished and substantially hydrocarbon precursor blend at a refinery, transporting the unfinished blend to a product terminal in the geographic area where the finished gasoline is to be distributed, and mixing the unfinished blend with the desired amount of alcohol at the product terminal.

When a subgrade is manufactured at a refinery, the subgrade's properties (characteristics) are measured and controlled to intermediate specifications (characteristics) that differ from the finished gasoline. Intermediate specifications are used to compensate for the effects of alcohol which will be added to the subgrade after it leaves the refinery. However, the effects of alcohols such as ethanol and methanol are variable and depend on the chemical composition of the subgrade. For example, the addition of ethanol has a substantial effect on gasoline volatility, and the magnitude of this effect is dependent on the chemical composition of the subgrade blend. The addition of ethanol to gasoline affects the distillation curve of the resulting product by reducing the evaporation temperatures of the front end, which affects primarily the first 50% evaporated. Ethanol generally depresses the boiling point of aromatic hydrocarbons slightly less than that of aliphatic hydrocarbons. In addition, blending ethanol into gasoline results in a nonideal solution that does not follow linear blending relationships. Rather than lowering the vapor pressure of the resulting blend, ethanol causes an increase in the vapor pressure.

In some embodiments, the variable effects which result when an alcohol, such as ethanol, is mixed with a subgrade blend to form a finished gasoline are taken into account by setting more stringent specifications for the finished gasoline than are ordinarily required. These more stringent specifications include a margin for error to accommodate the variable effect of the alcohol. Because of the margin for error, the desired specifications for the finished gasoline are usually exceeded.

In one embodiment, ethanol-containing gasoline is manufactured by a two step process which comprises manufacturing a relatively ethanol-free subgrade blend in a refinery, transporting the subgrade to a product terminal in the geographic area where the finished gasoline is to be distributed, and preparing the finished gasoline at the product terminal by mixing the subgrade with the desired amount of ethanol.

In one embodiment, the manufacture of gasoline which contains an alcohol, a plurality of blendstocks are combined, on the basis of analytical data for the blendstocks, to yield a subgrade blend which is subsequently mixed with the desired amount of alcohol to yield a finished gasoline which meets all necessary specifications for sale. However, because low molecular weight alcohols have a somewhat unpredictable effect on the octane and volatility of the resulting mixture, it is difficult to consistently produce a subgrade which will yield a finished gasoline of exactly the desired specifications when it is mixed with the desired amount of such alcohols. Since octane is one typical specification, the need to provide a margin for error frequently results in a finished product which has a higher than necessary octane and an associated higher manufacturing cost.

Monohydric aliphatic alcohols are usually most typical of the alcohols which are currently employed commercially in the manufacture of alcohol-containing gasoline. Alcohols which contain from 1 to about 10 carbon atoms can be conveniently used. Desirable alcohols will contain from 1 to 5 carbon atoms, and preferred alcohols will contain from 1 to 4 carbon atoms. For example, the alcohol of one alcohol-containing gasoline embodiment can be comprised of at least one compound which is selected from the group consisting of methanol, ethanol, 1-propanol, 2-propanol, 1-butanol, 2-butanol, 2-methyl-1-propanol, and 2-methyl-2-propanol. Methanol and ethanol are highly satisfactory alcohols for use, and ethanol is preferable due to its availability and widespread use.

Ethanol is conventionally produced from petrochemical feed stocks, such as oil, natural gas, or coal, from feed stock intermediates, such as syngas, or from starchy materials or cellulose materials, such as corn or sugar cane. Conventional methods for producing ethanol from petrochemical feed stocks, as well as from cellulose materials, include the acid-catalyzed hydration of ethylene, methanol homologation, direct alcohol synthesis, and Fischer-Tropsch synthesis. Instability in petrochemical feed stock prices contributes to fluctuations in the cost of conventionally produced ethanol, making the need for alternative sources of ethanol production all the greater when feed stock prices rise. Starchy materials, as well as cellulose material, are converted to ethanol by fermentation. However, fermentation is typically used for consumer production of ethanol for fuels or consumption. In addition, fermentation of starchy or cellulose materials competes with food sources and places restraints on the amount of ethanol that can be produced for fuel use.

Anhydrous ethanol or substantially anhydrous ethanol is often preferred for fuel applications. Anhydrous or substantially anhydrous ethanol, however, is often difficult to obtain from conventional hydrogenation and separation processes. For example, the ethanol and water produced in conventional hydrogenation reactions may form a binary azeotrope. This azeotrope contains about 95% ethanol and about 5% water. Because the boiling point of this azeotrope (78° C.) is just slightly below that of pure ethanol (78.4° C.), an anhydrous or substantially anhydrous ethanol composition is difficult to obtain from a crude ethanol composition via simple, conventional distillation.

A number of additional fermentation methods for producing ethanol are known to those having skill in the art. The produced ethanol compositions may comprise additional substances such as methanol, acetaldehyde, n-propanol, n-butanol, ethyl acetate, 3-methylbutanol, diethyl ether, acetone, secondary butanol, and crotonaldehyde.

In the practice of this invention, the finished alcohol-containing gasoline can be prepared by mixing any desired amount of alcohol with the relatively alcohol-free subgrade. For example, the finished gasoline could contain 1%, 10%, 50%, 95%, or any amounts in between those values, or any other amount of alcohol that might be desired. However, it will be appreciated that the invention will typically be most useful in manufacturing alcohol-containing gasoline for distribution to motorists. Accordingly, the finished alcohol-containing gasoline will usually contain an amount of alcohol which yields an oxygen content which conforms to any applicable government regulation.

In one embodiment, a finished gasoline which is prepared by mixing a subgrade with ethanol has an octane which is dependent upon: (1) the ratio of ethanol to subgrade, and (2) the octane and composition of the subgrade.

The amount of alcohol that is used in preparing an alcohol-containing gasoline can be different from that which is used in preparing the finished gasoline by blending a desired amount of alcohol with the subgrade. The response of the subgrade to a known amount of alcohol can be used as a basis to calculate the response of the subgrade to a different amount of alcohol which is mixed with the subgrade to yield the finished gasoline. That is to say, measurement of the subgrade's response to alcohol at one concentration can be used to accurately determine its response when mixed with a different amount of alcohol, for example, the desired amount to prepare the finished alcohol-containing gasoline. In the case of an octane specification for an ethanol-containing gasoline, if the ethanol/subgrade ratio of the analytical sample is lower than the target ratio for the finished gasoline that is to be manufactured from the subgrade, the octane analysis will be adjusted to reflect the fact that the finished gasoline will have a higher ethanol content. Typically, this will involve an upward adjustment of the octane analysis in view of ethanol's high octane relative to that of most conventional blendstocks. The magnitude of the adjustment will be dependent upon the amount of deviation of the ethanol/subgrade ratio of the analytical sample from the target ratio for the finished gasoline that is to be manufactured from the subgrade. If the ethanol/subgrade ratio of the analytical sample exactly matches that for the finished gasoline or the ratio is otherwise close enough per desired specification or regulations, that is to be produced from the subgrade, no adjustment will be necessary.

An embodiment can be carried out using an analytical sample of alcohol-containing gasoline which possesses an alcohol/subgrade ratio that can vary over wide range, and this ratio can be substantially different from that which is intended for the finished gasoline that is to be prepared from the subgrade. For example, the volumetric ratio of these two materials can have any value over the range from about 0.01 to about 0.95. However, it is preferable to use a volumetric ratio that is somewhat near that which is intended for the finished gasoline that is to be prepared from the subgrade blend. For example, if the finished gasoline is to contain 10.0 vol. % ethanol, the analytical sample would desirably have a volumetric ethanol/subgrade ratio in the range from about 0.06 to about 0.16, preferably in the range from about 0.08 to about 0.14, more preferably in the range from about 0.09 to about 0.13, and most preferably about 0.11. The closer the composition of the analytical sample is to that of the finished gasoline that is to be prepared from the subgrade blend, the smaller the correction that must be made to the analytical results in order to properly adjust and control the blending process to yield the desired subgrade.

If desired, the subgrade blend can be prepared in a batch process, with the analytical data for a mixture of the subgrade with alcohol being used to adjust and control the final composition of the subgrade. However, the subgrade blend is prepared in a substantially continuous process wherein a large volume of subgrade is prepared by continuously blending over a period of time a plurality of blendstocks, and wherein analytical data for a mixture of the subgrade with the alcohol is used to adjust and control the composition of the subgrade. In such a substantially continuous process, analytical samples can be prepared and analyzed periodically. Alternatively, in such a substantially continuous process, analytical samples can be prepared on a continuous or substantially continuous basis. For example, a preferred procedure involves continuously withdrawing a small slip-stream from the subgrade as it is produced and continuously mixing this slip-stream with a stream of alcohol which provides a known amount of alcohol in the resulting mixture. The fluid streams that are mixed to yield the analytical sample product stream can be metered and controlled through the use of any conventional procedure or device, for example, through the use of calibrated metering pumps. Analytical data for this continuously prepared analytical sample can then be measured as frequently as desired. The resulting data is used to control and optimize the blending process to produce a subgrade which will yield a gasoline of precisely the desired specifications when mixed with the desired amount of alcohol. In a highly preferred embodiment, a computer and conventional control software are used to control and optimize the proportion of the blendstocks in the resulting subgrade on the basis of the analytical data.

Any conventional blending procedure which uses analytical data for a process stream to control the properties of the resulting blend can be used in the practice of embodiments. One embodiment employs the use analytical data for at least one process stream to produce a fuel blend of desired properties, and it is also conventional to use computer control for such a process. An embodiment involves the use of analytical data for each of the blendstocks to control the process. For example, one gasoline blending process employs a centralized near-infrared spectrometer to gather analytical data for the various process streams and uses the data to adjust the blendstock flow rates to meet target specifications for the product blend through the use of control software. A variety of industrial and process controllers may be employed in the various embodiments disclosed herein, which are known to those skilled in the art.

The most straightforward way to incorporate ethanol into gasoline is by mixing, or "splash blending," which is utilized in one aspect of the invention. Various subgrades of gasoline, including catalytically cracked naphtha, reformate, virgin naphtha, isomerate, alkylate, and others are mixed with a desired amount of alcohol at a mixing site. The blending site may be geographically proximate to the area from which the gasoline is to be distributed but could also be geographically distant from the place where the subgrade is prepared. In one embodiment, the resulting blend is passed to a suitable storage facility such as a holding tank, or to an element of a distribution system, such as a pipeline, rail car, tanker truck, or barge. Splash blending is accomplished by manually loading individual components in the proper proportions according to the finished product recipe. Components are normally added one at a time through discrete product meters and loading arms.

Other blending methods, which represent other aspects of the embodiments disclosed herein, include automatic sequential blending, on rack ratio blending, side stream blending, hybrid ratio blending, hybrid stream side blending, proportional blending, and non-proportional blending, among other arrangements known by those having skill in the art.

Automatic sequential blending is accomplished by loading individual components in the proper proportion according to the finished product recipe. This is accomplished by opening product line block valves one at a time through one meter/load arm position in a set sequence to complete the finished product.

On rack ratio blending is accomplished by simultaneously combining two or more products through dedicated unique meters in respective amounts and flow rates according to the finished product recipe. This is accomplished at the individual loading position while delivering into a truck or rail car. This process is typically automated.

Side stream blending is accomplished by simultaneously combining a minor product flow through a dedicated flow meter and control valve upstream of the major products meter and control valve. The minor product flow is controlled based on the blended stream. This process is typically automated.

Hybrid ratio blending is accomplished by simultaneously combining a ratio product with a sequential product stream through unique meters and control valves in respective amounts and flow rates according to the finished product recipe. This is accomplished at the individual loading position while delivering into a truck or rail car. This process is typically automated.

Hybrid side stream—The blending is accomplished by simultaneously combining a ratio/minor product through a dedicated meter and control valve with a sequentially blended product upstream of the final blend meter and control valve. The two respective streams are proportionally blended according to the finished product recipe. This is accomplished at the individual loading position while delivering into a truck or rail car. This process is typically automated.

Proportional blending—In this blending method, the flow of each component is controlled by the preset to ensure the final desired blend ratio is maintained throughout the entire loading process. The advantage is that the product being loaded is on specification throughout the entire course of the load.

Non-proportional blending—In this blending method, the flow of each component is controlled by the preset, similar to the proportional method; however, some components may be loaded at a fixed flow rate or sequentially rather than being loaded proportionally throughout the course of the load. The potential disadvantage is that the product being loaded may not meet final specification until the completion of the load.

In one aspect, embodiments disclosed herein relate to processes for using renewable resources, such as ethanol, as a fuel component. More specifically, embodiments disclosed herein relate to various processes for splash blending and other types of blending of ethanol with a gasoline fraction.

In some embodiments, the blending procedures involve analyzing one or more process streams of a blending process and using the resulting analytical data to control the properties of the resulting blend are also known to those in the art, such as: the use of data obtained by near-infrared spectroscopy to control the composition of a product which is obtained by blending two or more components; the use of Raman near-infrared spectroscopy and multivariate analysis to control the concentration of one or more oxygenated components, such as alcohols, in a liquid mixture of hydrocarbons with one or more oxygenated component; methods for controlling the preparation of a blend, such as motor gasoline, from blend stocks through the use of data obtained from a combination of gas chromatography and mass spectrometry; and methods for controlling the blending of components to produce a blend, such as gasoline, which involves using data obtained by nuclear magnetic resonance spectroscopy, among other methods.

In a computer controlled blending process embodiment, analytical data from the analytical sample of this invention is transmitted to a control program which comprises blending algorithms which adjust the analytical results when the alcohol/subgrade ratio of the analytical sample varies from that of the desired target ratio for the finished gasoline. For example, in the case of an octane specification, if the alcohol/subgrade ratio of the analytical sample is lower than the target ratio for the finished gasoline that is to be manufactured from the subgrade, the algorithms will adjust the octane analysis to reflect the fact that the finished gasoline will have a higher alcohol content. In the case of ethanol, this will typically involve an upward adjustment of the octane analysis in view of ethanol's high octane relative to that of most conventional blendstocks. The magnitude of the adjustment will be dependent upon the amount of deviation of the alcohol/subgrade ratio of the analytical sample from the target ratio for the finished gasoline that is to be manufactured from the subgrade. If the alcohol/subgrade ratio of the analytical sample exactly matches that for the finished gasoline which is to be produced from the subgrade, the blending algorithms of the control program will make no adjustment.

In a computer controlled blending process embodiment, the control program will also comprise blending algorithms which will adjust the composition of the subgrade based on the analytical results that are transmitted to it. The adjustment of the subgrade composition is conveniently carried out by adjusting the relative amounts of the various blendstock which are used or by changing the blending recipe. For example, if analysis of the analytical sample indicates that the finished gasoline will have an octane which is below the target value, the octane of the subgrade could be increased by increasing the amount of one or more of the higher octane blendstocks which are being used in its manufacture. As the octane of the subgrade increases, that of the finished gasoline will also increase.

Conventional blendstocks which can be used in the manufacture of a subgrade blend in accordance with the invention include, but are not limited to, catalytically cracked naphtha, reformate, virgin naphtha, isomerate, alkylate, raffinate, natural gasoline, polymer gasoline, pyrolysis gasoline, pentane, butane, xylene, and toluene. In one embodiment, the subgrade will be comprised of at least 80 vol. % of a mixture of hydrocarbons. In another embodiment, a fuel-grade ethanol, which may contain about 95% ethanol in combination with a denaturant, is added to the subgrade blend to produce a finished ethanol-containing gasoline.

In other embodiments, a more simple blending approach is taken. In these embodiments, operators have at their disposal one or more blend stocks of gasoline and one or more sources of alcohol (ethanol). In these embodiments, instead of feedback control or analytical samples, the known characteristics of the various blend stock source(s) and alcohol source(s) are used to pre-calculate the amount each source is input into the terminal for mixing. In these embodiments, known characteristics (data) are transmitted to a control program which comprises blending algorithms that manage the input of each component source at the terminal and thus at the point of distribution, without need for feedback or analytical sample analysis or adjustment. As shown below these embodiments may optionally contain a volume correction computer which is configured to calculate the additional volume generated by mixing an ethanol containing gasoline.

Still, in another embodiment, the target desired amount of alcohol in the finished gasoline product is precalculated. The blend stock of gasoline is specifically formulated based on this desired amount of alcohol, so that it is understood by the operators that a simple addition of a known quantity of alcohol will complete the blend stock to create a finished gasoline product. In this embodiment, which can take place as a continuous or batch process, the operator inputs the desired ratio, quantities, amounts, and/or flowrates of gasoline blendstock and alcohol. As an illustrious example, which is not intended to be limiting, in one embodiment, an operator may select to have the finished gasoline contain roughly 10% of ethanol. In such embodiment, the operator selects the system to have such a desired output, and controllers allow a 9:1 ratio of gasoline blend stock to ethanol to flow into a distribution point. As shown below these embodiments may optionally contain a volume correction computer which is configured to calculate the additional volume generated by mixing an ethanol containing gasoline.

In a preferred embodiment of the invention, the optimized subgrade composition is transported to a blending site which is geographically proximate to the area in which the finished alcohol-containing gasoline is to be distributed for use. The finished gasoline is then prepared by mixing the subgrade with the desired amount of alcohol at said blending site.

In one embodiment of a blending system, of the component streams are provided from the same refinery. However, any one of the streams used can be provided from an outside source.

The conventional margin for error ensures that the required specifications for the finished gasoline are met, and its magnitude is generally set at value which is at least as large as the variability of the effect of the alcohol on the property (characteristic) in question. These properties can include, but are not limited to, octane, Reid vapor pressure, Driveability Index ("DI"), wt. % oxygen, and distillation properties such as the 10% distillation point ("T10"), the 50% distillation point ("T50"), and the 90% distillation point ("T90") as defined by the ASTM D 86-95 procedure, or by conventional alternative procedures.

Specific and precise amounts of one or more hydrocarbon feedstocks, optionally one or more oxygenate feedstocks, and optionally one or more additives are combined in order to obtain one or more predetermined desired characteristics in the resultant fuel composition. Examples of the desired fuel composition properties include aromatic hydrocarbon content (amount of aromatic hydrocarbons in the fuel composition); paraffin content (amount of paraffins in the fuel composition); benzene content (amount of benzene in the fuel composition); olefin content (amount of olefins in the fuel composition); oxygen content (amount of actual oxygen in the fuel composition); oxygenate content (amount of combustible liquids which are made up of carbon, hydrogen and oxygen in the fuel composition); sulfur content (amount of actual sulfur in the fuel composition); D-86 Distillation Points such as 10% distillation temperature (the temperature at which 10% of the fuel composition evaporates), 50% distillation temperature (the temperature at which 50% of the fuel composition evaporates), and 90% distillation temperature (the temperature at which 90% of the fuel composition evaporates); Reid Vapor Pressure (RVP); boiling point; Research Octane Number (RON); Motor Octane Number (MON); (R+M)/2 octane; specific gravity; latent heat of evaporation; lead content; anti-knock value; volumes; flowrates; temperatures; pressures; set feedstock ratios; desired alcohol content of the finished gasoline product; and the like.

In some embodiments, when forming a fuel composition, one or more fuel composition property (characteristic) is monitored, two or more fuel composition properties are monitored, three or more fuel composition properties are monitored, four or more fuel composition properties are monitored, five or more fuel composition properties are monitored, six or more fuel composition properties are monitored, seven or more fuel composition properties are monitored, and so on.

In some embodiments, the gasoline blendstock may simply be mixed with an alcohol in predetermined ration based on known or measured feedstock characteristics that are obtained prior to mixing. In this embodiment, feedback measurement and control systems are not necessarily required, and instead or in addition to those systems, volumetric controls regulate how much of each feedstock (blendstock and alcohol) are input to the finished gasoline product after mixing.

When blending components in accordance with the present invention to make a fuel composition such as gasoline, it is often desirable to control certain chemical and/or physical properties. For example, it is often desirable to vary the amount of individual components blended to one or more of increase, maintain, or decrease, but typically decrease the 50% D-86 Distillation Point; increase, maintain, or decrease, but typically decrease the olefin content; increase, maintain, or decrease, but typically increase the paraffin content; increase, maintain, or decrease, but typically decrease the RVP; increase, maintain, or decrease, but typically increase the RON; increase, maintain, or decrease, but typically decrease the 10% D-86 Distillation Point; increase, maintain, or decrease, but typically decrease the 90% D-86 Distillation Point; increase, maintain, or decrease, but typically increase the anti-knock value; and increase, maintain, or decrease, but typically increase the aromatic content.

As disclosed herein, there are a number of principal methods for assessing the volatility of gasoline: (1) measuring the vapor to liquid ratio, (2) measuring the vapor pressure, and (3) measuring the distillation temperature. The Reid method is a standard test for measuring the vapor pressure of petroleum products. Reid vapor pressure (RVP) is related to true vapor pressure but is a more accurate assessment for petroleum products because it considers sample vaporization as well as the presence of water vapor and air in the measuring chamber. The distillation temperature is another important standard for measuring the volatility of petroleum products. When blending gasoline with volatility modifying agents, the distillation temperature (TD) often cannot fall below a prescribed value. TD refers to the temperature at which a given percentage of gasoline volatilizes under atmospheric conditions and is typically measured in a distillation unit. For example, the gasoline can be tested for T(50), which represents the temperature at which 50% of the gasoline volatilizes, or it can be measured at T(10), T(90), or some other temperature value.

In embodiments, the gasoline-alcohol blend composition comprises an alcohol, and preferably ethanol, concentration of at least about 0.01, 0.1, 0.2, 0.3, 0.4, 0.5, 0.6, 0.7, 0.8, 0.9, 1.0, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 99 or 100 vol. % based on the total volume of the composition (v/v %), and useful ranges can be selected between any of these values (for example, about 0.01 vol. % to about 99 vol. %, about 0.01 vol. % to about 1 vol. %, about 0.1 vol. % to about 10 vol. %, about 0.5 vol. % to about 10 vol. %, about 1 vol. % to about 5 vol. %, about 5 vol. % to about 25 vol. %, about 5 vol. % to about 95 vol. %, about 5 vol. % to about 80 vol. %, about 10 vol. % to about 95 vol. %, about 15 vol. % to about 95 vol. %, about 20 vol. % to about 95 vol. %, about 25 vol. % to about 95 vol. %, about 30 vol. % to about 95 vol. %, about 35 vol. % to about 95 vol. %, about 40 vol. % to about 95 vol. %, about 45 vol. % to about 95 vol. %, about 50 vol. % to about 95 vol. %, about 1 vol. % to about 99 vol. %, about 5 vol. % to about 99 vol. %, about 10 vol. % to about 99 vol. %, about 15 vol. % to about 99 vol. %, about 20 vol. % to about 99 vol. %, about 25 vol. % to about 99 vol. %, about 30 vol. % to about 99 vol. %, about 35 vol. % to about 99 vol. %, about 40 vol. % to about 99 vol. %, about 45 vol. % to about 99 vol. %, about 50 vol. % to about 99 vol. %, about 5 vol. % to about 70 vol. %, about 10 vol. % to about 70 vol. %, about 15 vol. % to about 70 vol. %, about 20 vol. % to about 70 vol. %, about 25 vol. % to about 70 vol. %, about 30 vol. % to about 70 vol. %, about 35 vol. % to about 70 vol. %, about 40 vol. % to about 70 vol. %, about 45 vol. % to about 70 vol. %, and about 50 vol. % to about 70 vol. %, about 60 vol. % to about 90 vol. % based on the total volume of the composition). The concentration of alcohol, and preferably ethanol, can be readily determined and, in some embodiments, depends on the alcohol or oxygen content of the desired composition for fuel blending or fuel blend.

In embodiments, the concentration of gasoline or BOB in the finished gasoline product is at least about 0.01, 0.1, 0.2, 0.3, 0.4, 0.5, 0.6, 0.7, 0.8, 0.9, 1.0, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 99 or 99.5 vol. % based on the total volume of the composition (v/v %), and useful ranges can be selected between any of these values (for example, about 0.01 vol. % to about 99 vol. %, about 5 vol. % to about 95 vol. %, about 5 vol. % to about 80 vol. %, about 10 vol. % to about 95 vol. %, about 15 vol. % to about 95 vol. %, about 20 vol. % to about 95 vol. %, about 25 vol. % to about 95 vol. %, about 30 vol. % to about 95 vol. %, about 35 vol. % to about 95 vol. %, about 40 vol. % to about 95 vol. %, about 45 vol. % to about 95 vol. %, about 50 vol. % to about 95 vol. %, about 1 vol. % to about 99 vol. %, about 5 vol. % to about 99 vol. %, about 10 vol. % to about 99 vol. %, about 15 vol. % to about 99 vol. %, about 20 vol. % to about 99 vol. %, about 25 vol. % to about 99 vol. %, about 30 vol. % to about 99 vol. %, about 35 vol. % to about 99 vol. %, about 40 vol. % to about 99 vol. %, about 45 vol. % to about 99 vol. %, about 50 vol. % to about 99 vol. %, about 5 vol. % to about 70 vol. %, about 10 vol. % to about 70 vol. %, about 15 vol. % to about 70 vol. %, about 20 vol. % to about 70 vol. %, about 25 vol. % to about 70 vol. %, about 30 vol. % to about 70 vol. %, about 35 vol. % to about 70 vol. %, about 40 vol. % to about 70 vol. %, about 45 vol. % to about 70 vol. %, and about 50 vol. % to about 70 vol. %, about 60 vol. % to about 90 vol. %, or about 75 vol. % to about 90 vol. % based on the total volume of the composition).

In another embodiment a gasoline or BOB, of increased octane from a fungible regular gasoline or BOB is produced at a terminal (and distributed) by determining nominal values of required volatility parameters of the fungible regular gasoline or BOB and then preparing a high-octane terminal blend stock having volatility parameters such that, when blended with fungible regular gasoline or BOB having the nominal required volatility parameters, yields a gasoline or BOB within the required limits.

This process allows a refinery to take advantage of predictable deviations away from the maximum or minimum limits for a fungible regular fuel where the composition of that fuel is relatively constant. Where the volatility-related parameters of the regular fungible gasoline are not reliably known, the high-octane terminal blending stock can be prepared so that its volatility-related parameters are seasonally adjusted (i.e. within the limits for the given class of gasoline) for the unpredictable parameters, while allowing the volatility of the HOBS to vary more widely to take advantage of the predicted volatility-related parameters of the fungible base fuel. In this manner, when preparing an ASTM compliant fuel, up to five of Reid Vapor Pressure, T10, T50, T90, V/L and Driveability Index in the HOBS may be seasonally adjusted.

When a gasoline or ethanol supply or stream is identified herein as comprising a plurality of batches of multiple gasoline or ethanol types, each batch will be understood to include only one type of fluid that is primarily either gasoline or ethanol. It will also be understood that the plurality of batches originate from multiple locations, and that they have been consolidated into one stream from trunk lines servicing the various origination points. When a gasoline supply or stream is described as varying in volatility potential, it will be understood that the volatility of the gasoline when blended with ethanol will vary over time. The volatility potential of a gasoline can vary due to the content of the gasoline. For example, different gasolines can contain varying amounts and types of aromatic hydrocarbons, and these hydrocarbons can cause the volatility of gasoline when blended with ethanol to vary over time.

The invention supports a number of embodiments. Unless otherwise specified, each of the following embodiments can be implemented at any point along a petroleum pipeline—i.e. at the rack, where gasoline is unloaded onto transport tanker trucks ("at the rack" includes both (1) along the line from a storage tank immediately prior to the rack and (2) along the line between a storage tank and an intermediate temporary storage tank immediately prior to the rack), along a consolidated pipeline that transmits multiple types of gasoline from different sources such as refineries or ports, and along a pipeline that transmits only one type of gasoline (as in a line that transmits only one type of gasoline to an above-ground storage tank). The tank farm at which ethanol is blended may be a terminal gasoline tank farm (where tanker trucks are filled), an intermediate gasoline tank farm (from which gasoline is distributed to multiple end locations), or a combined use tank farm (that serves as an intermediate point and a terminal point). In one embodiment, the systems and methods further include transmitting the blended gasoline stream to an above-ground storage tank (i.e. a tank that is permanently constructed on a piece of land, typically with berms around its periphery to contain any petroleum spills) or an intermediate temporary storage tank immediately prior to the rack. Embodiments herein provide both methods of blending and distributing and the system components for blending and distributing, and it will be understood that each method embodiment has a corresponding system embodiment, and that each system embodiment has a corresponding method embodiment.

In the U.S., the volume of motor fuel is considered normal at 60 degrees F. As the temperature goes lower than 60 degrees, the volume contracts. As the temperature goes above 60 degrees, the volume expands. Like all liquids, when refined fuels cool, they condense and occupy less space. Conversely, when they warm, they expand and occupy more space. In the United States, market participants buy and sell fuel based on volume—the actual (gross) volume at the current temperature. For example, one gallon of gasoline at 40 degrees Fahrenheit (F) has 1.4% greater mass, 1.4% more molecules, and 1.4% greater ability to power an engine than a gallon at 60 degrees F. In another example, in the hot summer months, the temperature of the gasoline at the delivery truck can be higher than the insulated tanks below. When the warmed-up gas flows into the tank, it hits the cooler temperatures and begins to contract. That contraction means that a delivered load of 1000 gallons will actually end up less than 1000 gallons in the tanks. The net fuel is less than the gross delivered. In another example, In the cold winter months, the temperature of the gas at the delivery truck can be lower than in the insulated tanks below. When the cool fuel flows into the tank, it hits the warmer temperatures and begins to expand. That means the 1000 gallons delivered will end up being more than 1000 gallons in the tank. The net fuel is more than the gross delivered.

When distributing fuel at a terminal, the fuel that is delivered from the rack by a supplier is known as the gross volume. The gross volume is the actual amount of fuel that leaves the tanks, at whatever temperature the fluid is. The gross volume is dependent on temperature. Conversely, the net volume of fuel is the amount of fuel is the gross volume of fuel that is corrected for temperature (and pressure if needed) to a normalized 60 degrees F. Using a thermodynamic formula, the industry calculates the size of the fuel's expansion or contraction due to the difference in temperature.

In simpler terms, the number of gallons coming out of the rack (the gross amount delivered) is adjusted up or down to be normalized for the volume it would have at 60 degrees F. This adjustment of the gross amount makes up for the loss in volume during hot weather and the gain in volume during cooler weather. This temperature-corrected calculation determines the "net" gallons delivered.

Pursuant to API standards such as API Manual of Petroleum Measurement Standards, Chapters 11.1 and 11.2.1 (which are both incorporated herein by reference), blends of gasoline and ethanol shall be corrected to base conditions using API MPMS Chapter 11.1 (or 11.2.1 as the case may be), which corrects temperatures to a normalized 60 degrees F. Pressure corrections may also be employed pursuant to API Manual of Petroleum Measurement Standards, Chapters 11.1 and 11.2.1, although this is less commonly performed in relation to distribution of gasoline ethanol blends due to relative incompressibility of the liquid components.

It has been discovered that blending mixtures of ethanol and gasoline blendstocks also results in an apparent volume growth due to interactions between alcohol and gasoline blendstocks—aside from the simple thermal expansion discussed above—when the resulting mixture is measured for volume in comparison to the relative volumes of the component parts. Experimental and field experience has demonstrated that blending ethanol into gasoline blending stocks results in a mixture that exhibits apparent volume growth over that simple addition of the blended volumes. The mixture also shows an incremental increase in the coefficient of thermal expansion over that expected by volume proportional addition of the blend stock coefficients. When BOB and ethanol are mixed, the two fluids are infinitely soluble in each other and form a single liquid phase. The fluids are chemically different in that BOB is a hydrocarbon mixture consisting primarily of non-polar and aromatic molecules and ethanol is polar. This difference leads to the fluids' molecules interacting at a molecular level. A construct that explains the observed effects on physical properties, is that the ethanol molecules interfere with the densest alignment of the BOB nonpolar molecules leading to a decrease in expected density or the creation of "excess volume". The same interaction causes the thermal expansion for the mixture to be larger than the expected expansion for a hydrocarbon fluid of that density or for a volumetric average of the BOB and ethanol components themselves.

The American Petroleum Institute (API) gathered a series of laboratory density measurements at various temperatures, pressures, and concentrations for four BOB samples, four denatured ethanol samples, and the 16 possible combinations thereof. The laboratory results were evaluated to filter out outliers and procedural artifacts, and the remaining dataset of 1662 samples were used in regression studies. The studies determined the functions and parameters that best fit the "excess functions". Combining the excess functions with the previously documented API MPMS Chapter 11.1 functions extends the range of API MPMS Chapter 11.1 to blends of gasoline and denatured ethanol blends. The results of the findings generated to the contribution of API Manual of Petroleum Measurement Standards, Chapter 11.3.4, Miscellaneous Hydrocarbon Product Properties—Denatured Ethanol and Gasoline Component Blend densities and Volume Correction Factors, the entirety of which (including Annexes) is hereby incorporated by reference into this Application. API MPMS Chapter 11.3.4 thus defines a series of "volume correction" factors to allow users to determine the true volume of ethanol and gasoline mixtures at given temperatures and compositions of each respective component. The volume correction factors used herein shall be determined using the methods outlined by API Chapter 11.3.4 for various ethanol-gasoline mixtures at various temperatures wherein the ethanol gasoline mixtures contain between 0% ethanol and 95% ethanol (inclusive).

One aspect of the invention relates to a system for making a fuel composition containing a delivery system for providing fuel composition components to a blending system (e.g., pipe, tank, vessel, truck), the delivery system containing one or more hydrocarbon feedstock, one or more oxygenate feedstock, and optionally one or more additive feed; a fuel composition property monitor (feedback system) for determining at least one fuel composition property; and a controller for controlling amounts of fuel composition components provided to the blending system by the delivery system based upon at least one fuel composition property.

Some embodiments herein feature a computer configured to calculate one or both of the temperature/pressure based expansion of the finished gasoline product and/or the volumetric correction of the expansion of the finished gasoline product in accordance with the API Chapters discussed herein. In some embodiments, the pressure is known to be at or about atmospheric pressure, so pressure sensors are unnecessary.

In one embodiment, a featured feedback system includes components capable of determining one or more properties (characteristic) of the composition in the blending tank and providing this data or information to the controller. For example, the feedback system may contain one or more of a Reid Vapor Pressure monitor, a sensor, a spectrometer, boiling point monitor, a gas phase chromatographer, a liquid phase chromatographer, 10% distillation temperature monitor, 50% distillation temperature monitor, 90% distillation temperature monitor, D-86 Distillation Point monitor, Research Octane Number monitor, Motor Octane Number (MON) monitor, (R+M)/2 octane monitor, specific gravity monitor, anti-knock monitor, latent heat of evaporation monitor, lead content monitor, desired gasoline/alcohol ratios monitors, octane desired monitors, flowrate monitors, volume monitors, temperature monitors, pressure monitors, chemical composition monitors, API gravity monitors, and the like. The temperature monitors (sensors) may be implemented by any quantity of any conventional or other type of temperature measuring devices disposed at any suitable locations for measuring the temperature of the respective fluids. Likewise any of the other monitors or sensors may be implemented by any quantity of any conventional or other type of measuring, monitoring, or sensing devices disposed at any suitable locations. The feedback system draws a sample of the composition from the blending tank, analyzes the sample and generates information about one or more properties of the composition, then sends the information to the controller.

In one embodiment, feedback operation is not necessary. Instead a more simple blending approach is taken. In these embodiments, operators have at their disposal one or more blend stocks of gasoline and one or more sources of alcohol (ethanol). In these embodiments, instead of feedback control or analytical samples, the known characteristics of the various blend stock source(s) and alcohol source(s) are used to pre-calculate the amount each source is input into the terminal for mixing. In these embodiments, known characteristics (data) are transmitted to a control program which comprises blending algorithms that manage the input of each component source at the terminal and thus at the point of distribution, without need for feedback or analytical sample analysis or adjustment. These embodiments, and others discussed herein, may optionally contain a volume correction computer which is configured to calculate the additional volume generated by mixing an ethanol containing gasoline.

Still, in another embodiment, the target desired amount of alcohol in the finished gasoline product is precalculated. The blend stock of gasoline is specifically formulated based on this desired amount of alcohol, so that it is understood by the operators that a simple addition of a known quantity of alcohol will complete the blend stock to create a finished gasoline product. In this embodiment, which can take place as a continuous or batch process, the operator inputs the desired ratio, quantities, amounts, and/or flowrates of gasoline blendstock and alcohol. As an illustrious example, which is not intended to be limiting, in one embodiment, an operator may select to have the finished gasoline contain roughly 10% of ethanol. In such embodiment, the operator selects the system to have such a desired output, and controllers allow a 9:1 ratio of gasoline blend stock to ethanol to flow into a distribution point. As shown below these embodiments may optionally contain a volume correction computer which is configured to calculate the additional volume generated by mixing an ethanol containing gasoline.

In one embodiment, a featured controller can include a processor, optionally coupled to a memory, a programmable logic circuit, and the like, that may be programmed or configured to control operation of the delivery system. The memory can store program code executed by the processor for carrying out the operating functions of the system described herein. The memory may also serve as a storage medium for temporarily storing information from the delivery system and/or feedback system. Information representing desirable or predetermined properties of a resultant fuel composition may be charged to the controller. This information collected and stored by the memory herein may be optionally delivered to other blending plant systems, record keeping, or for audit and invoicing purposes for third parties. For example, one or more of a specific aromatic hydrocarbon content (amount of aromatic hydrocarbons in the fuel composition); paraffin content (amount of paraffins in the fuel composition); benzene content (amount of benzene in the fuel composition); olefin content (amount of olefins in the fuel composition); oxygen content (amount of actual oxygen in the fuel composition); oxygenate content (amount of combustible liquids which are made up of carbon, hydrogen and oxygen in the fuel composition); sulfur content (amount of actual sulfur in the fuel composition); D-86 Distillation Points such as 10% distillation temperature (the temperature at which 10% of the fuel composition evaporates), 50% distillation temperature (the temperature at which 50% of the fuel composition evaporates), and 90% distillation temperature (the temperature at which 90% of the fuel composition evaporates); Reid Vapor Pressure (RVP); boiling point; Research Octane Number (RON); Motor Octane Number (MON); (R+M)/2 octane; specific gravity; latent heat of evaporation; lead content; anti-knock value; volumes; flowrates; temperatures; pressures; set feedstock ratios; desired alcohol content of the finished gasoline product; and the like, may be input into the controller.

In one embodiment, there is a volume correction computer. The volume correction computer can include a processor, optionally coupled to a memory, a programmable logic circuit, and the like, that may be programmed or configured to determine the net volume of finished gasoline provided as determined via API Chapter 11.3.4 and accounting for pressure and/or temperature corrections if needed. The memory can store program code executed by the processor for carrying out the operating functions of the system described herein, including volume corrections pursuant to API Chapter 11.3.4. The memory may also serve as a storage medium for temporarily storing information from the various system components. This information collected and stored by the memory herein may be optionally delivered to other blending plant systems, record keeping, or for audit and invoicing purposes for third parties.

Computers and controller embodiments herein may feature routines, programs, objects, components, data structures, and the like, which perform particular tasks or implement control or determination operations. Computer executable instructions, associated data structures, and program modules represent examples of the program code means for executing acts of the methods disclosed herein. Computing devices within certain embodiments may include general or more specific computing systems, which may include: a processing unit, a system memory, and a system bus that couples various system components including the system memory to the processing unit. Processing units can execute computer-executable instructions designed to implement features of computer system, including features of the present invention. The system bus may be any of several types of bus structures including a memory bus or memory controller, a peripheral bus, and a local bus using any of a variety of bus architectures. The system memory includes read only memory ("ROM") and random access memory ("RAM"). A basic input/output system ("BIOS"), containing the basic routines that help transfer information between elements within computer system, such as during start-up, may be stored in ROM.

The computer system may also include hard disk drive (or other storage media such as a solid state disk) for reading from and writing to hard disk, disk drive for reading from or writing to removable disk, and optical disk drive for reading from or writing to removable optical disk, such as, for example, a CD-ROM or other optical media. The hard disk drive, disk drive, and optical disk drive may be connected to the system bus by hard disk drive interface, disk drive-interface, and optical drive interface, respectively. The drives and their associated computer-readable media provide nonvolatile storage of computer-executable instructions, data structures, program modules, and other data for the computer system. Although the example environment described herein employs hard disk, removable disk and removable optical disk, other types of computer readable media for storing data can be used.

In some embodiments, program code comprising one or more program modules may be stored on hard disk, disk drive, optical disk, ROM or RAM, including an operating system, one or more application programs, other program modules, and program data. In one embodiment, a user may enter commands and information into computer system through keyboard, pointing device, or other input devices, such as, for example, a microphone, joystick, game pad, scanner, or the like. These and other input devices can be connected to the processing unit through input/output interface coupled to system bus. Input/output interface logically represents any of a wide variety of different interfaces, such as, for example, a serial port interface, a PS/2 interface, a parallel port interface, a Universal Serial Bus ("USB") interface or may even logically represent a combination of different interfaces.

In one embodiment, a monitor or other display device may also be connected to system bus via video interface. Other peripheral output devices, such as, for example, printers, can also be connected to computer system.

In some embodiments, the computer systems may be connectable to computer networks, such as, for example, an office-wide or enterprise-wide computer network, an intranet, and/or the Internet. Computer system can exchange data with external sources, such as, for example, remote computer systems, remote applications, and/or remote databases over such computer networks.

In one embodiment, a computer system may include network interface, through which computer system receives data from external sources and/or transmits data to external sources. The network interface facilitates the exchange of data with remote computer system. Network interface can logically represent one or more software and/or hardware modules, such as, for example, a network interface card and corresponding Network Driver Interface Specification ("NDIS") stack.

Likewise, in one embodiment, the computer system includes input/output interface, through which computer system receives data from external sources and/or transmits data to external sources.

A control system may include one or more controllers and may optionally be connected to one or more sensors such as flow rate monitors (meters) and temperature monitors. These connections may take place via wired or wireless communications systems. Alternatively, these connections may take place via pneumatic linkage, magnetic connection, or through other methods known in the art. A control system may include a combination of software and hardware within a network to balance the industrial infrastructure. In some embodiments, control systems may include one or more of the following: as programmable logic controllers (PLCs), supervisory control and data acquisition (SCADA), industrial automation and control systems (IACS), remote terminal units (RTUs), intelligent electronic devices (IEDs) control severs, and sensors.

PLCs are capable of performing various industrial applications with inbuilt modules like power supply, CPU, I/O modules, and other communication modules. The PLCs can be integrated or modular. A modular PLC is compact and fixed with limited I/O functions, whereas integrated PLC extends I/O modules based on its features. The input module may be connected with sensors, while actuators or other output devices are optionally connected with the output module.

SCADA systems may be used for monitoring long-distance field sites through a centralized mechanism. They generally contain devices such as PLCs or other commercial hardware modules to be distributed in various locations. They are known to provide capabilities of supervision at the supervisory level.

Distributed control systems (DCS) may also be employed. These systems are typically used to control productions in one location. The desired set point is maintained to be sent to the controller or actuator instructing valves. This data may be retained for future references or used in advanced control strategies. A supervisory control loop may be used by each DCS to manage multiple local devices or controllers. Furthermore, a DCS is capable of eliminating the impact of a single fault on the whole system.

In the scenario where more than one controller is implemented in a control system, the more than one controller can be interconnected with other controls, or the more than one controller can be independent from other controllers. A variety of control systems may be featured in the embodiments.

While the computer and controller systems discussed herein represent a suitable operating environment for certain embodiments, the principles of embodiments may also be employed in any system that is capable of, with suitable modification if necessary, implementing various aspects of the embodiments discussed herein. The environment discussed above is illustrative only and by no means represents even a small portion of the wide variety of environments in which the principles of the present invention may be implemented.

The embodiments can be realized in hardware, software, or a combination of hardware and software. Embodiments can be realized in a centralized fashion in one computer system, or in a distributed fashion where different elements are spread across several interconnected computer systems. Any kind of computer system, or other apparatus adapted for carrying out the methods described herein, is suited to perform the functions described herein. Importantly, the computers used as controllers described herein may also function as the computers used to determine volume correction and vice versa. In another embodiment, separate controllers (computers) are used to control a variety of aspects of the embodiments, whereas an independent computer is used to calculate corrections in volume due to temperature, pressure, and the volume correction that comes from mixing gasoline components and alcohols, particularly ethanol.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow. Aspects of the invention may take place in the forms of systems, apparatuses, methods, processes and/or any other means known to those skilled in the art.

FIG. 1 depicts an embodiment 100 of a system for distributing alcohol-containing gasoline. A gasoline blendstock source 101 is in fluid communication via pipe 120 with control valve 103 which regulates flow of the contents of the gasoline blendstock source. The gasoline blendstock temperature monitor 104 monitors the temperature of the contents of the gasoline blendstock source. The contents of the gasoline blendstock source are flowed through gasoline blendstock flow meter 105, wherein the gasoline blendstock flow meter is configured to monitor the quantity of contents flowed through or passed it. Separately, an alcohol source 102 is in fluid communication via pipe 121 with control valve 106 which regulates flow of the contents of the alcohol source. The alcohol temperature monitor 107 monitors the temperature of the contents of the alcohol source. The contents of the alcohol source are flowed through alcohol flow meter 108, wherein the alcohol flow meter is configured to monitor the quantity off contents flowed through or passed it. A control system 111 is in connection with one or more of and configured to receive, compute, and relay information optionally from/to any or all of control valve 103, gasoline blendstock temperature monitor 104, gasoline blendstock flow meter 105, alcohol control valve 106, alcohol temperature monitor 107, alcohol flow meter 108, optional operations inputs 112, and/or volume correction computer 113. The control system 111 is configured to regulate gross quantities of contents from the gasoline blendstock source and is configured to regulate gross quantities of contents from the alcohol source. Both the contents of the gasoline blendstock source are flowed from gasoline blendstock flow meter 105 and the contents of the alcohol source are flowed from the alcohol flow meter 108 to a distribution point 109, at which point a finished gasoline product is created. The finished gasoline product is optionally flowed through pipe 122 and into any receiving vessel 110 such as a tank, truck, ship, or any other vessel. A volume correction computer 113 is in connection with one or more of the control valve 103, gasoline blendstock temperature monitor 104, gasoline blendstock flow meter 105, alcohol control valve 106, alcohol temperature monitor 107, alcohol flow meter 108, optional operations inputs 112, and/or the control system 111. The volume correction computer 113 is configured to calculate the net volume of finished gasoline product created at the distribution point, and in an embodiment, such calculation is depicted by block flow diagram 115. An output 114 is optionally generated by the volume correction computer 113 to assist operators, receivers, and other personnel with verifying the net quantities of finished gasoline that have been created at the distribution point. Said output 114 could take the form of digital/virtual information and/or it could also take the form of an invoice electronically generated or printed in hard copy by way of known I/O computer peripherals.

Figure 2:
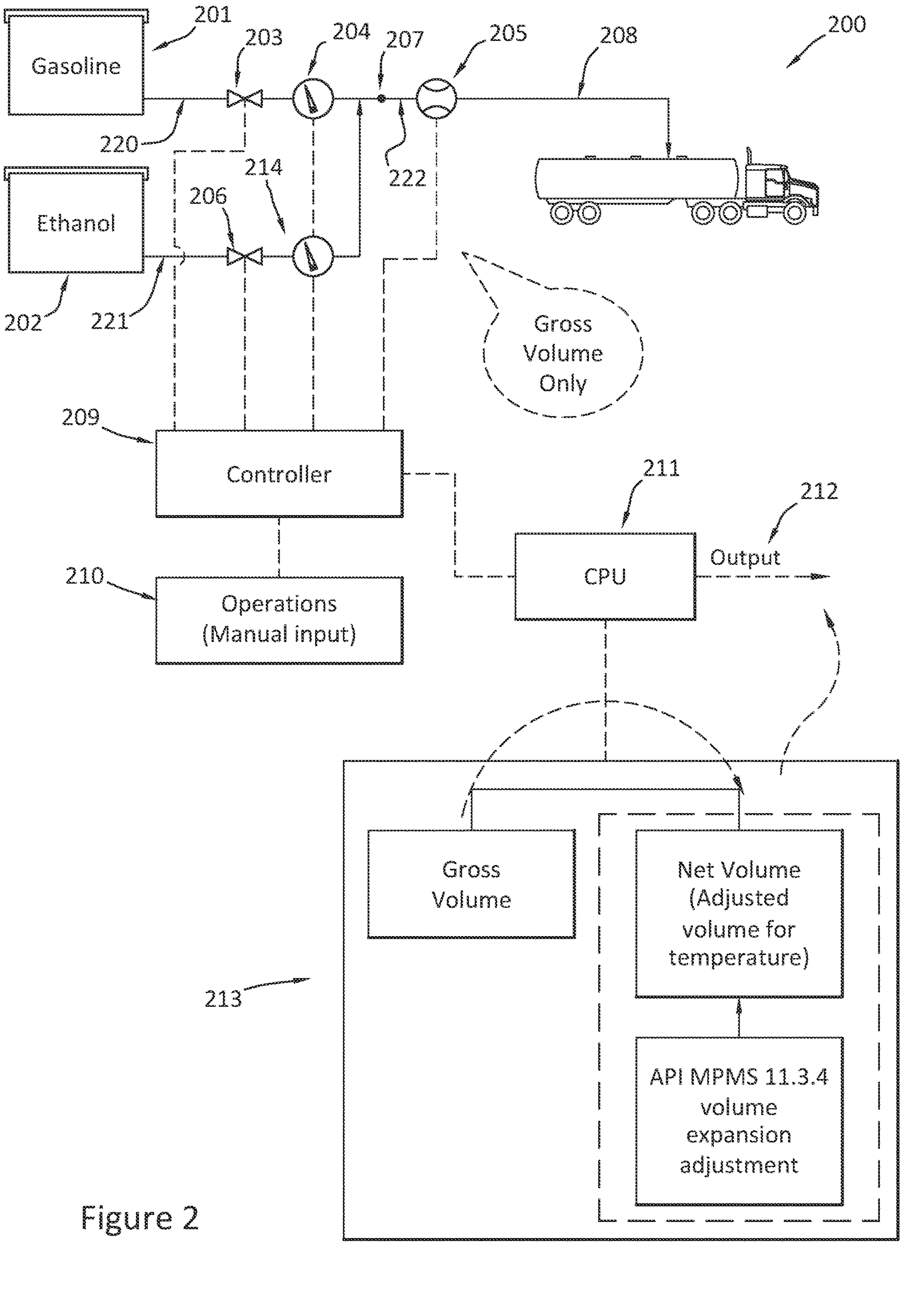
FIG. 2 depicts a system for distributing alcohol-containing gasoline.

FIG. 2 depicts an embodiment 200 of a system for distributing alcohol-containing gasoline. A gasoline blendstock source 201 is in fluid communication via pipe 220 with control valve 203 which regulates flow of the contents of the gasoline blendstock source. The gasoline blendstock temperature monitor 204 monitors the temperature of the contents of the gasoline blendstock source. Separately, an alcohol source 202 is in fluid communication via pipe 221 with control valve 206 which regulates flow of the contents of the alcohol source. The alcohol temperature monitor 214 monitors the temperature of the contents of the alcohol source. The contents of the gasoline blendstock source are flowed through control valve 203 and the contents of the alcohol source are flowed through control valve 206 in fluid communication with one another to distribution point 207, at which point a finished gasoline product is created. The finished gasoline product is flowed through pipe 222 to a finished gasoline product flow meter 205 which is configured to monitor the quantity of finished gasoline product. A control system 209 is in connection with one or more of and configured to receive, compute, and relay information optionally from/to any or all of control valve 203, gasoline blendstock temperature monitor 204, alcohol control valve 206, alcohol temperature monitor 214, finished gasoline product flow meter 205, optional operations inputs 210, and/or volume correction computer 211. The control system 209 is configured to regulate gross quantities of finished gasoline product. The finished gasoline product is optionally flowed through pipe (unlabeled) and into any receiving vessel 208 such as a tank, truck, ship, or any other vessel. A volume correction computer 211 is in connection with one or more of the control valve 203, gasoline blendstock temperature monitor 204, finished gasoline product flow meter 205, control valve 206, alcohol temperature monitor 214, optional operations inputs 210, and/or the control system 209. The volume correction computer 211 is configured to calculate the net volume of finished gasoline product created at the distribution point, and in an embodiment, such calculation is depicted by block flow diagram 213. An output 212 is optionally generated by the volume correction computer 211 to assist operators, receivers, and other personnel with verifying the net quantities of finished gasoline that have been created at the distribution point. Said output 212 could take the form of digital/virtual information and/or it could also take the form of an invoice electronically generated or printed in hard copy by way of known I/O computer peripherals.

Figure 3:
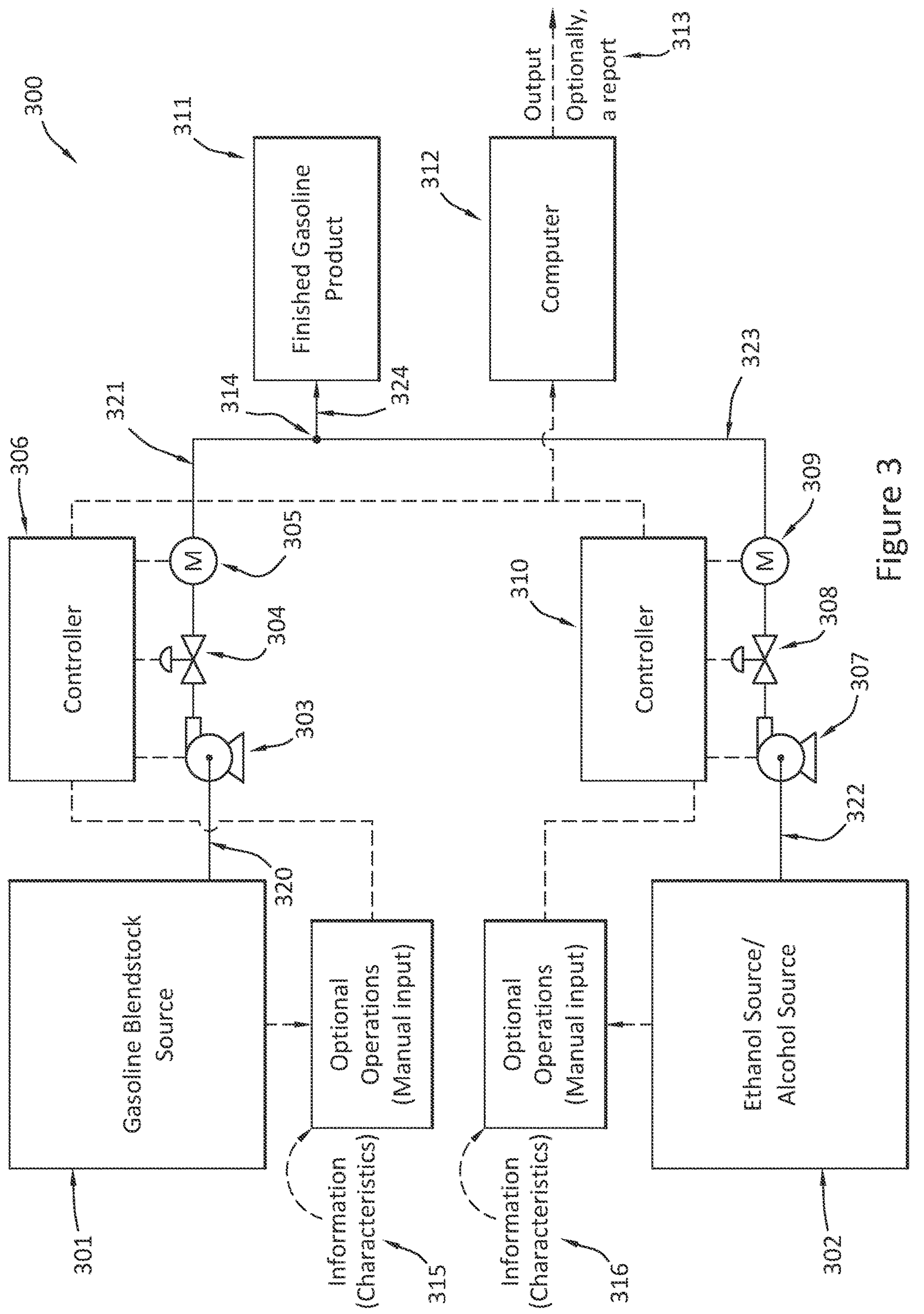
FIG. 3 depicts a system for distributing alcohol-containing gasoline.

FIG. 3 depicts an embodiment 300 of a system for distributing alcohol-containing gasoline. A gasoline blendstock source 301 is in fluid communication via pipe 320 with pump 303 and control valve 304, which regulate flow of the contents of the gasoline blendstock source. Information and/or characteristics 315 about the gasoline blendstock source (such as temperature, API gravity, etc.) via corresponding equipment known in the art (not shown) and are input into control system 306, described in further detail below. The contents of the gasoline blendstock source are flowed through the gasoline blendstock flow meter 305, wherein the gasoline blendstock flow meter is configured to monitor the quantity of contents flowed through or passed it. Separately, an alcohol source 302 is in fluid communication via pipe 322 with pump 307 and control valve 308, which regulate flow of the contents of the alcohol source. Information and/or characteristics 316 about the alcohol source (such as temperature, API gravity, etc.) via corresponding equipment known in the art (not shown) and are input into control system 310, described in further detail below. Notably, control system 306 and control system 310 may be the same systems or separate systems and said control systems may be configured in a variety of ways. The contents of the alcohol source are flowed through the alcohol flow meter 309, wherein the alcohol flow meter is configured to monitor the quantity of contents flowed through or passed it. The control systems 306 and 310 are in connection with one or more of and configured to receive, compute, and relay information optionally from/to any or all of one another, control pump 303, control valve 304, gasoline blendstock flow meter 305, pump 307, control valve 308, alcohol flow meter 309, information inputs 315, information inputs 316, and/or volume correction computer 312. The control system(s) 306 and/or 310 are configured to regulate gross quantities of contents from the gasoline blendstock source and/or the gross quantities of contents from the alcohol source. The contents of the gasoline blendstock source are flowed from the gasoline blendstock flow meter 305 via pipe 321 and the contents of the alcohol source are flowed from the alcohol flow meter 309 via pipe 323 together to meet at distribution point 314, at which point a finished gasoline product is created. The finished gasoline product is then optionally flowed through pipe 324 and into any receiving vessel (not shown) such as a tank, truck, ship, or any other vessel. A volume correction computer 312 is in connection with one or more of the pump 303, control valve 304, gasoline blendstock flow meter 305, control system 306, pump 307, control valve 308, alcohol flow meter 309, control system 310, information input 315, and/or information input 316. The volume correction computer 312 is configured to calculate the net volume of finished gasoline product created at the distribution point. An output 313 is optionally generated by the volume correction computer 312 to assist operators, receivers, and other personnel with verifying the net quantities of finished gasoline that have been created at the distribution point. Said output 313 could take the form of digital/virtual information and/or it could also take the form of an invoice electronically generated or printed in hard copy by way of known I/O computer peripherals.

Figure 4:
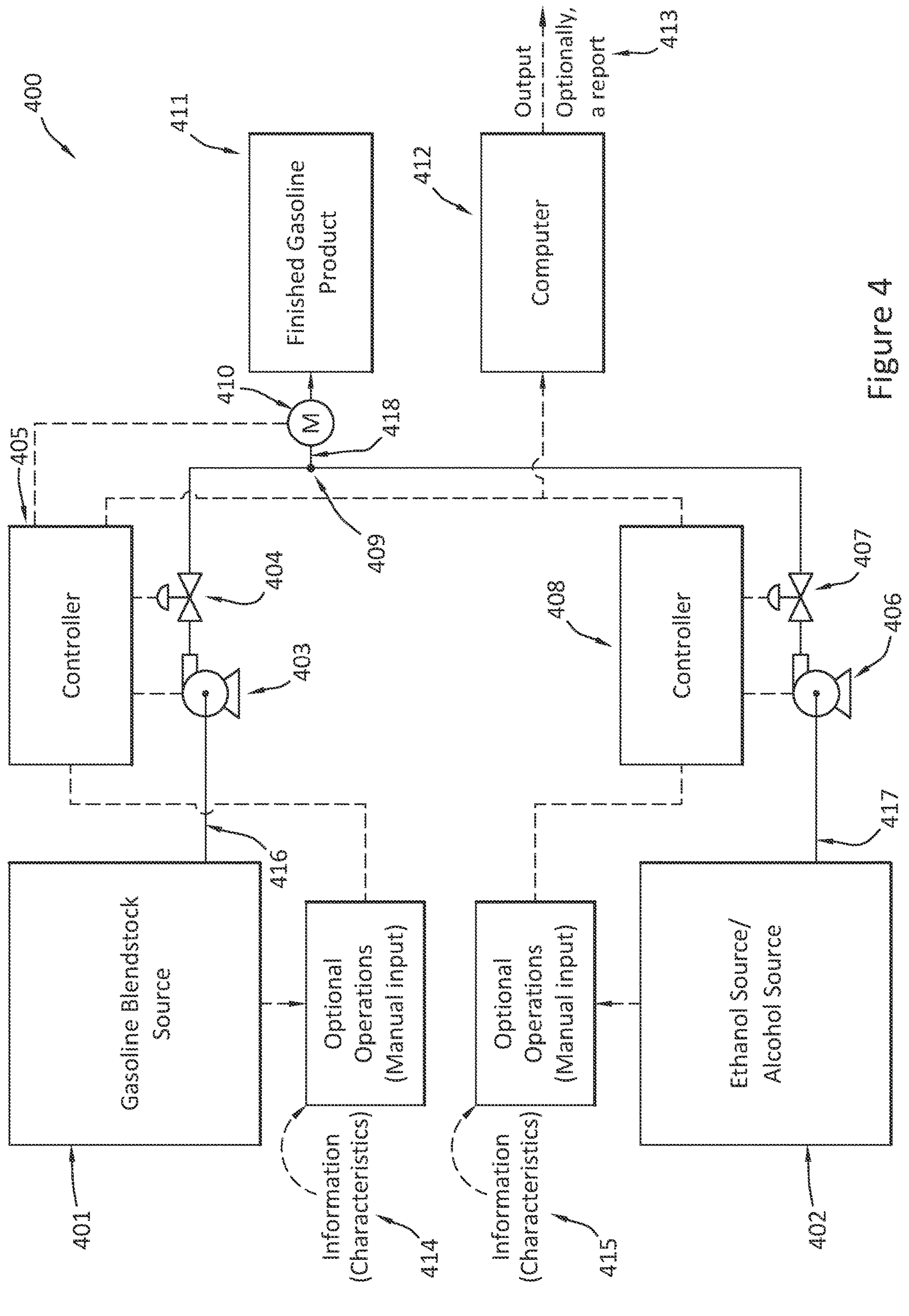
FIG. 4 depicts a system for distributing alcohol-containing gasoline.

FIG. 4 depicts an embodiment 400 of a system for distributing alcohol-containing gasoline. A gasoline blendstock source 401 is in fluid communication via pipe 416 with pump 403 and control valve 404, which regulate flow of the contents of the gasoline blendstock source. Information and/or characteristics 414 about the gasoline blendstock source (such as temperature, API gravity, etc.) via corresponding equipment known in the art (not shown) and are input into control system 405, described in further detail below. Separately, an alcohol source 402 is in fluid communication via pipe 417 with pump 406 and control valve 407, which regulate flow of the contents of the alcohol source. Information and/or characteristics 415 about the alcohol source (such as temperature, API gravity, etc.) via corresponding equipment known in the art (not shown) and are input into control system 408, described in further detail below. The contents of the gasoline blendstock source are flowed through control valve 404 and the contents of the alcohol source are flowed through control valve 407 in fluid communication with one another to distribution point 409, at which point a finished gasoline product is created. The finished gasoline product is flowed through pipe 418 to a finished gasoline product flow meter 410 which is configured to monitor the quantity of finished gasoline product. The control systems 405 and 408 are in connection with one or more of and configured to receive, compute, and relay information optionally from/to any or all of one another, pump 403, control valve 404, pump 406, control valve 407, information inputs 414, information inputs 415, finished gasoline product flow meter 410, and/or volume correction computer 412. The control system(s) 405 and/or 408 are configured to regulate gross quantities of contents from the gasoline blendstock source, the gross quantities of contents from the alcohol source, and/or the gross quantities of finished gasoline product from the distribution point. The finished gasoline product is optionally flowed through pipe (unlabeled) and into any receiving vessel 411 such as a tank, truck, ship, or any other vessel. A volume correction computer 412 is in connection with one or more of the pump 403, control valve 404, control system 405, pump 406, control valve 407, control system 408, information input 414, information input 415, and/or finished gasoline product flow meter 410. The volume correction computer 412 is configured to calculate the net volume of finished gasoline product created at the distribution point. An output 413 is optionally generated by the volume correction computer 412 to assist operators, receivers, and other personnel with verifying the net quantities of finished gasoline that have been created at the distribution point. Said output 413 could take the form of digital/virtual information and/or it could also take the form of an invoice electronically generated or printed in hard copy by way of known I/O computer peripherals.

As used herein, the terms “comprises,” “comprising,” “includes,” “including,” “has,” “having,” “contains,” or “containing,” or any other variation thereof, are intended to be non-exclusive or open-ended. For example, a composition, a mixture, a process, a method, an article, or an apparatus that comprises a list of elements is not necessarily limited to only those elements but may include other elements not expressly listed or inherent to such composition, mixture, process, method, article, or apparatus. Further, unless expressly stated to the contrary, “or” refers to an inclusive or and not to an exclusive or. For example, a condition A or B is satisfied by any one of the following: A is true (or present), and B is false (or not present), A is false (or not present), and B is true (or present), and both A and B are true (or present).

Also, the indefinite articles “a” and “an” preceding an element or component of the invention are intended to be nonrestrictive regarding the number of instances, i.e., occurrences of the element or component. Therefore “a” or “an” should be read to include one or at least one, and the singular word form of the element or component also includes the plural unless the number is obviously meant to be singular.

The term “invention” or “present invention” as used herein is a non-limiting term and is not intended to refer to any single embodiment of the particular invention but encompasses all possible embodiments as disclosed in the application.

As used herein, the term “about” modifying the quantity of an ingredient or reactant of the invention employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or to carry out the methods; and the like. The term “about” also encompasses amounts that differ due to different equilibrium conditions for a composition resulting from a particular initial mixture. Whether or not modified by the term “about”, the claims include equivalents to the quantities. In one embodiment, the term "about" means within 10% of the reported numerical value, preferably within 5% of the reported numerical value.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

The invention claimed is:

1. A process for distributing alcohol-containing gasoline comprising:
- creating a gasoline blendstock source comprising gasoline blendstock;
- configuring a gasoline blendstock temperature monitor in connection with the gasoline blendstock source to monitor a temperature of the gasoline blendstock and produce a gasoline blendstock temperature measurement;
- flowing the gasoline blendstock through a gasoline blendstock flow meter to measure a net quantity of gasoline blendstock removed from the gasoline blendstock source;
- creating an ethanol source comprising ethanol;
- configuring an ethanol temperature monitor in connection with the ethanol source to monitor a temperature of the ethanol and produce an ethanol temperature measurement;
- flowing ethanol through an ethanol flow meter to measure a net quantity of ethanol removed from the ethanol source;
- creating a distribution point in fluid communication with the gasoline blendstock flow meter and the ethanol flow meter, wherein the gasoline blendstock flowed through the gasoline blendstock flow meter is combined with the ethanol flowed through the ethanol flow meter to create a finished gasoline product at the distribution point;
- regulating the gross quantity of the gasoline blendstock flowed from the gasoline blendstock source to the distribution point and the gross quantity of ethanol flowed from the ethanol source to the distribution point via a control system in connection with the gasoline blendstock flow meter and the alcohol flow meter, wherein the control system comprises a volume correction computer that comprises a processor and memory containing program code, wherein the program code comprises instructions that calculate a net volume of the finished gasoline product created at the distribution point based on the gross quantity of gasoline blendstock, the gross quantity of ethanol, the gasoline blendstock temperature measurement and the ethanol temperature measurement, wherein the instructions account for the temperature-dependent volumetric expansion of finished gasoline blends comprising a mixture of gasoline blendstock and ethanol;
- generating an invoice based on the net volume of finished gasoline product wherein the net volume of finished gasoline product is larger than the gross volume of the sum of the net quantity of gasoline blendstock and the net quantity of ethanol.

2. The process according to claim 1, wherein the ethanol dispensed from the ethanol source contains less than 5% water by net volume.

3. The process according to claim 1, wherein the ethanol dispensed from the ethanol source comprises at least 95% ethanol by volume.

4. The process according to claim 1, wherein the finished gasoline product comprises from 10% to 99% gasoline blendstock by volume.

5. The process according to claim 1, wherein the finished gasoline product comprises from 1% to 90% ethanol by volume.

6. The process according to claim 1, wherein the volume correction computer is configured to calculate the net volume of finished gasoline product created at the distribution point in accordance with methods described by American Petroleum Institute Manual of Petroleum Measurement Standards Chapter 11.3.4.

7. The process according to claim 1, wherein the control system is configured to regulate the gross quantity of gasoline blendstock flowed from the gasoline blendstock source and the gross quantity of ethanol flowed from the alcohol source to the distribution point based on at least one characteristic of the finished gasoline product, selected from: ratio of gross quantity of gasoline blendstock versus alcohol, Research Octane Number, Motor Octane Number, antiknock index, Reid vapor pressure, Driveability Index, oxygen content, 10% distillation point, 50% distillation point, 90% distillation point, and ethanol content.

8. The process according to claim 1, wherein the antiknock index of the finished gasoline product is in the range from 70 to 105.

* * * * *